Nov. 11, 1969  G. F. HAWLEY  3,477,397
FLAT ARTICLE PROCESSING APPARATUS HAVING A COMMON
BLANK SUPPLY FEEDING A PLURALITY OF WORKLINES
Filed Oct. 20, 1967  9 Sheets-Sheet 3
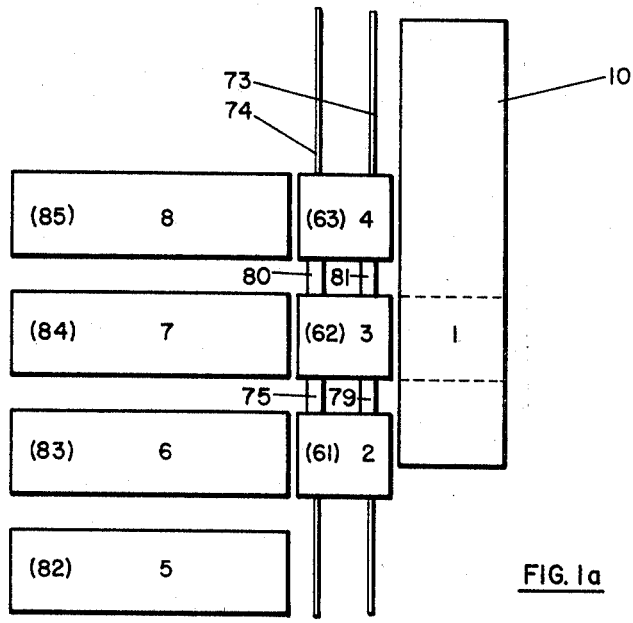
FIG. 1a
FIG. 2a
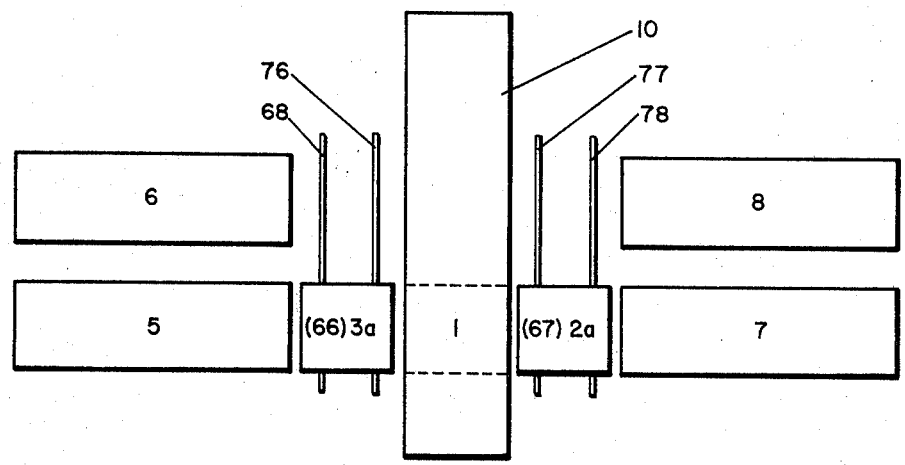
INVENTOR
GEORGE F. HAWLEY
BY
*Kenneth E. Mirkler*
ATTORNEY

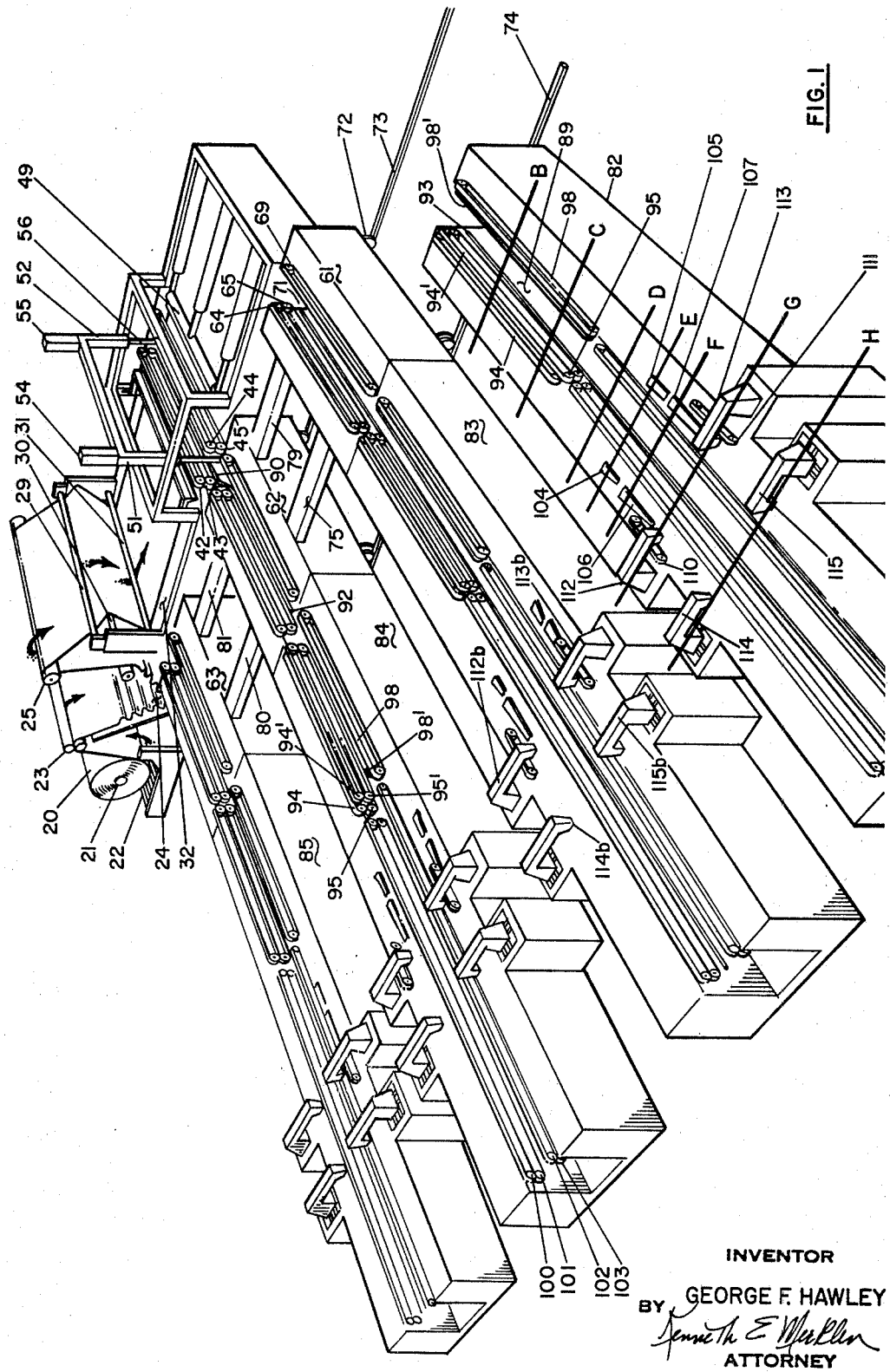

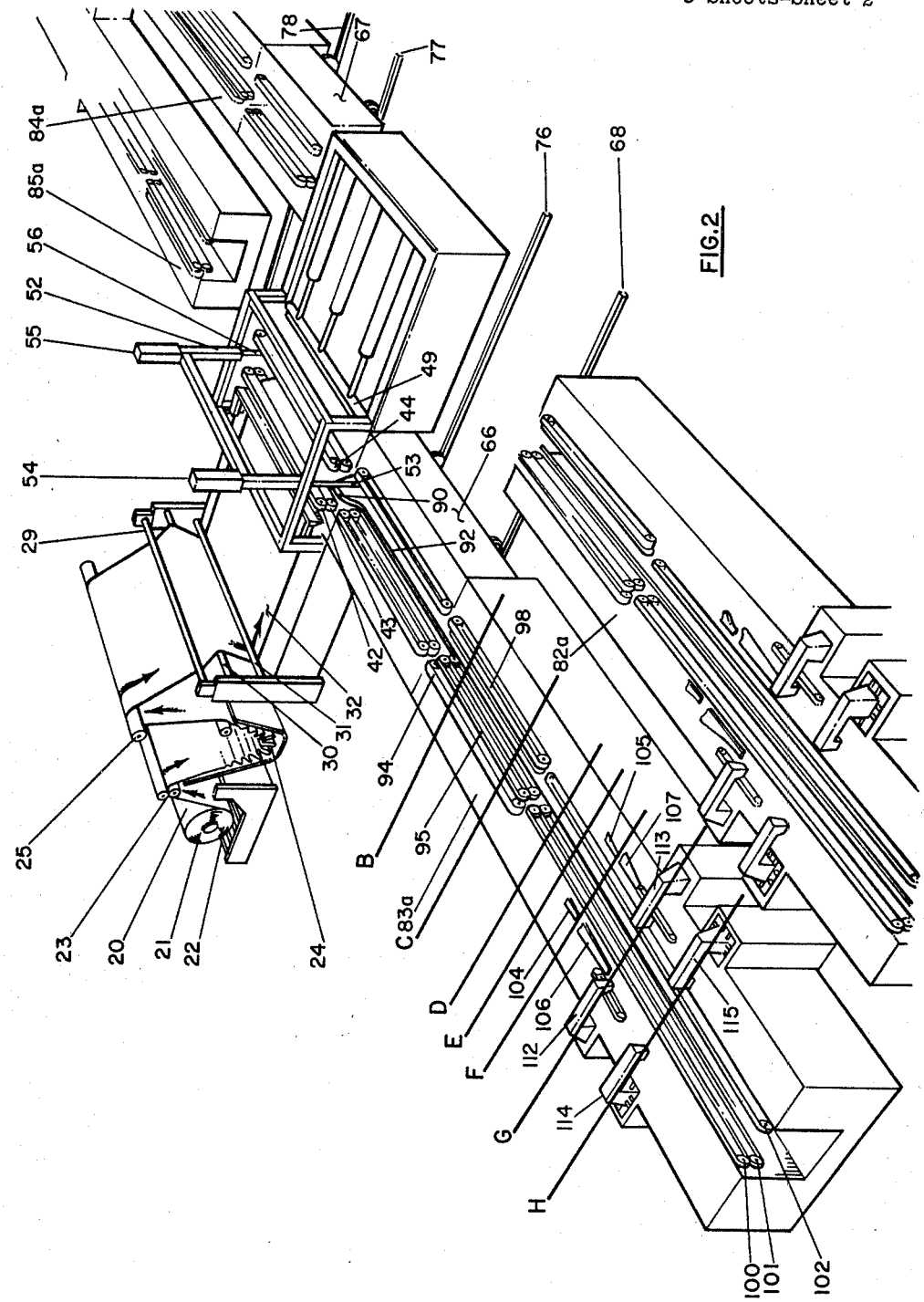

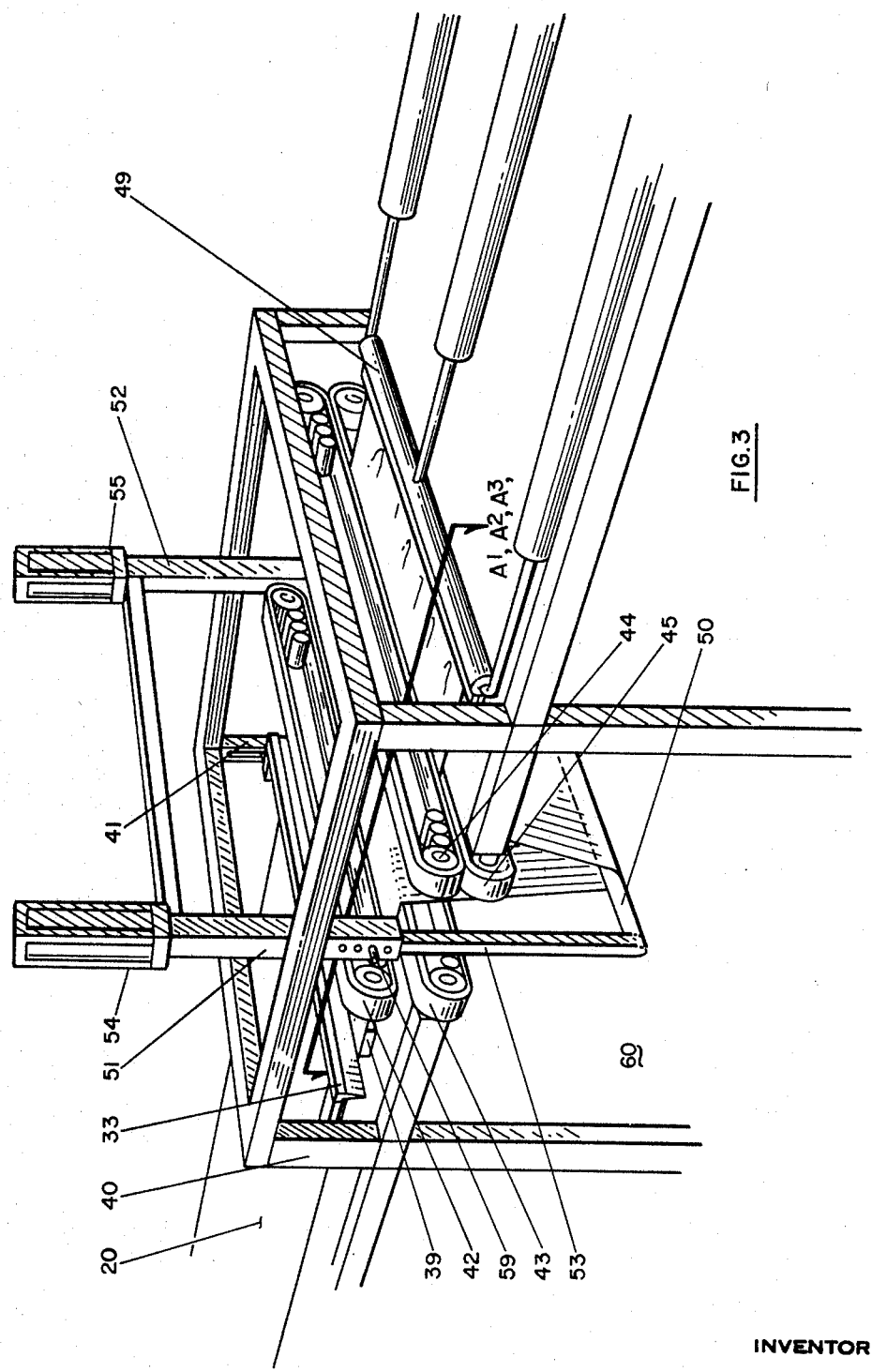

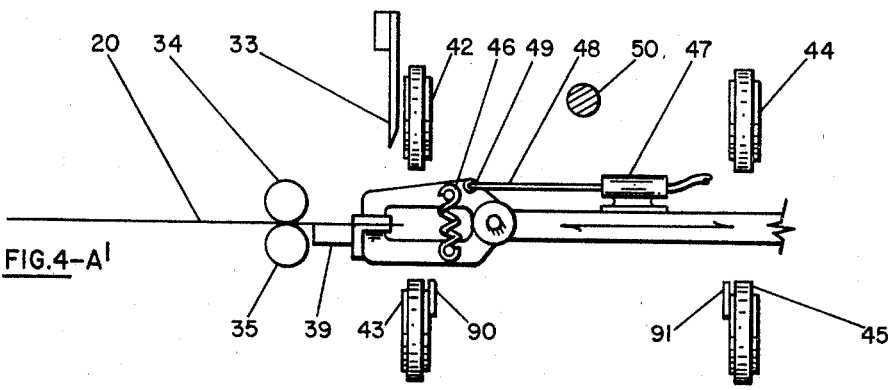
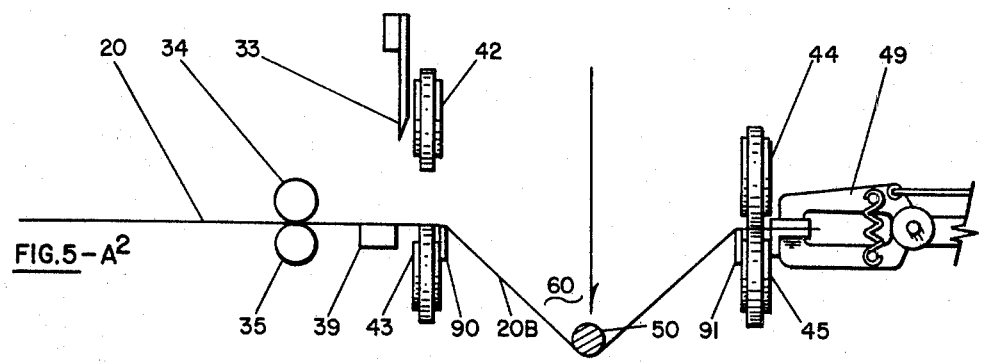
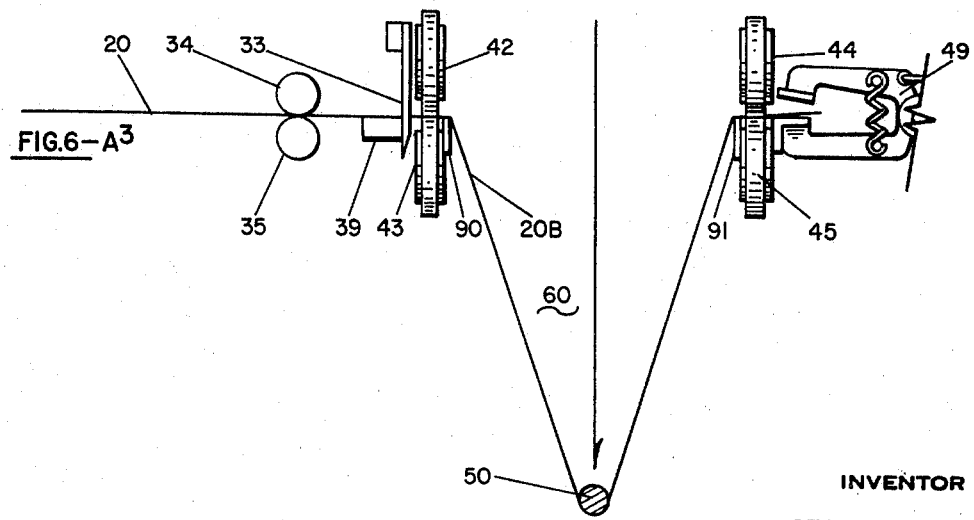

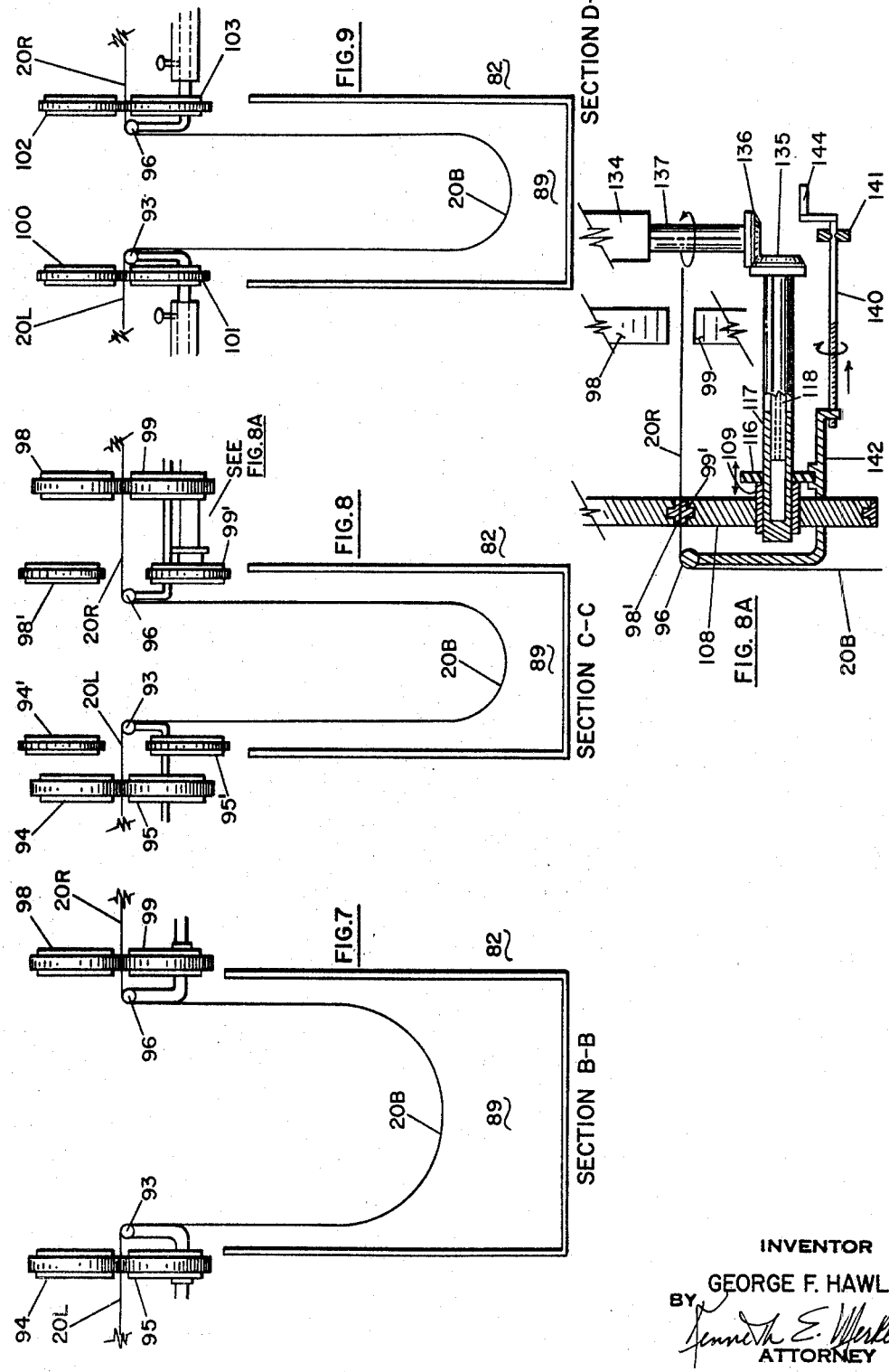

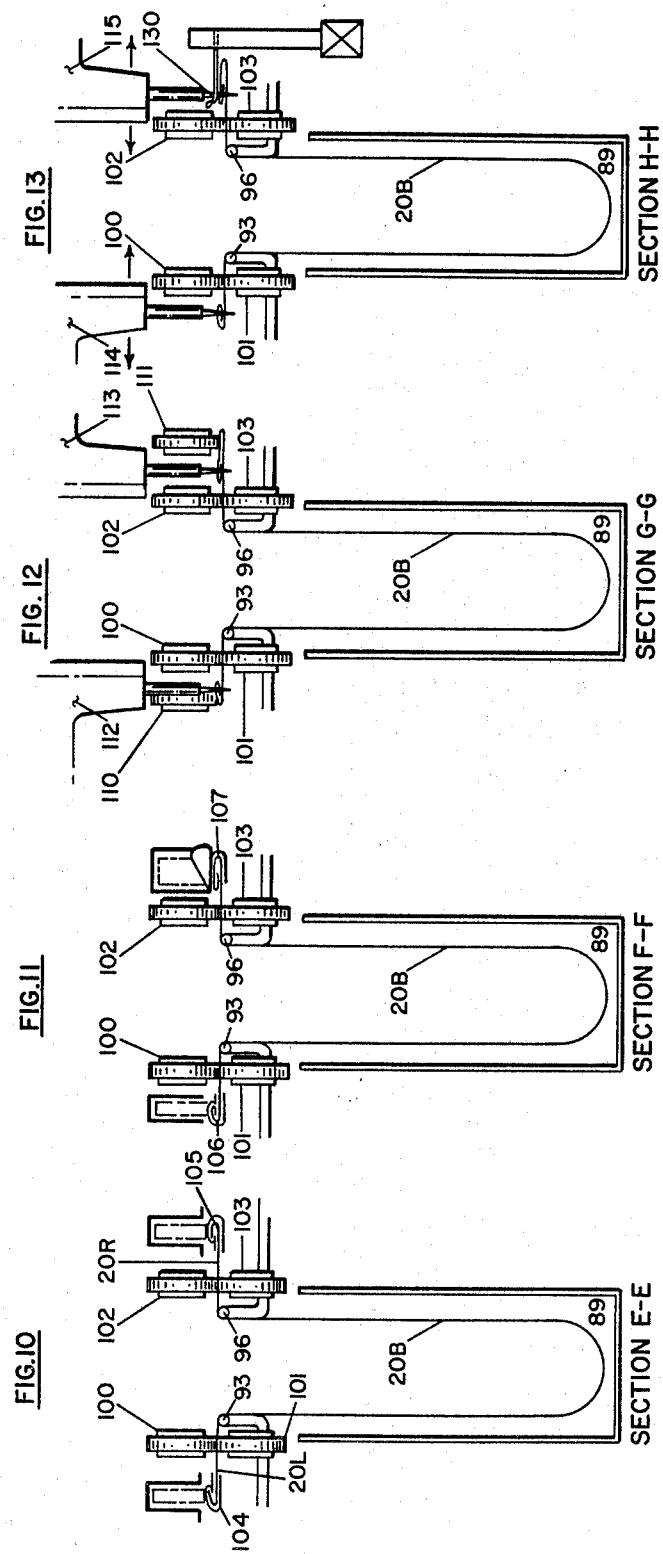

United States Patent Office

3,477,397
Patented Nov. 11, 1969

3,477,397
FLAT ARTICLE PROCESSING APPARATUS HAVING A COMMON BLANK SUPPLY FEEDING A PLURALITY OF WORKLINES
George F. Hawley, Bogota, N.J., assignor to Wagner Research Corporation, New York, N.Y., a corporation of New York
Filed Oct. 20, 1967, Ser. No. 676,756
Int. Cl. D05b 25/00, 27/00
U.S. Cl. 112—2      21 Claims

ABSTRACT OF THE DISCLOSURE

Integrated apparatus for automatically processing bulk limp materials into finished flat articles, such as bed-sheets, in which the full potential of a common material blank sizing and cutting device is exploited. The overall apparatus employs a novel method and device for sizing and cutting relatively large material blanks using vertical depression of the material for sizing and a guillotine type cutter for separating the sized material from the bulk supply. Transfer and conveyance of the cut blank is accomplished with the blank in a hanging condition. The material blank is transferred to a shuttle which distributes successive blanks sequentially to each workline or sew line of a plurality of worklines or sew lines. During the sizing operating the material is depressed into a sizing channel such that the cut blank is in a hanging condition. This hanging condition of the blank is preserved throughout transfer and conveyance. The blank is conveyed along a work or sewing line which during conveyance folds a hem on both cut ends of the blank and hem stitches the hem folds. The stitched hems are also closed on both ends during such conveyance thus forming the finished article. The structure of the overall apparatus is characterized by a short draw mechanism, with vertical draw bar, a shuttle for transferring and distributing cut blanks and narrow sewing lines with a blank transfer channel having work surfaces on the shoulders of the transfer channel.

---

The present invention relates to apparatus for automatically processing bulk pliable material, such as cloth, for example, into finished flat articles, such as bed sheets, for example. In particular, the present invention relates to fully integrated apparatus for automatically producing finished flat articles from bulk or roll material and utilizes more fully, the potential of a common feed functioning from a bulk source of material.

The present invention greatly advances current practice in the art of making flat articles from bulk pliable material. Bulk pliable material may be cloth or fabric, natural or synthetic, felted or unfelted or any other material normally used for bed-sheets, table cloths, towels, and/or other flat articles generally in the category of lines, which material is generally in the form of a reel or roll of material containing several thousand yards of goods. In the process of making flat articles from bulk material, the usual practice has been to use material which has been woven or otherwise processed so as to form a selvage edge on the opposite long or longitudinal edges of the material and cut the material into predetermined length thus forming a blank. The blank is then hem folded on the raw or cut edges and sewn with a double fold to conceal the raw edge. The hems are then sewn closed thereby forming a finished flat article, such as a bed-sheet, for example. In some cases, a label or other identifying mark or description may be added or printed on the blank. The present invention follows this general practice.

It is desirous that apparatus for automatically processing bulk material into finished flat articles accomplish such process with maximum speed while taking up minimum space. In addition convenient access to the apparatus must be maintained in order to clean and/or clear the apparatus as cleaning and/or clearing may be required.

Generally, the present invention teaches a fully integrated, automatic apparatus which draws a relatively small portion of material from a bulk supply or source, cuts small portion to a predetermined size, hereinafter referred to as a blank, prepares the blank for conveyance, conveys such blank to one of a plurality of processing or sewing lines in a cycle of distribution of blanks, processes the blank by hem folding the cut edges and sewing the hemmed edges and deposits the processed blank as a finished article.

The bulk material may be in the form of a roll of woven material containing several thousand yards of goods, for example cloth. In the making of bed-sheets, for example, the roll material could be mulsin or percale or any other material normally used for making bed-sheets. Such bulk material is normally woven with selvage edges along the length of the material. The material is unrolled or drawn off of the roll in such a manner as to form a reserve or slack stock from which material for forming a blank may be drawn with relatively little resistance. The slack material is drawn across an inspection station which essentially scans the material for defects. At a position essentially "down-stream" from the inspection station is the blank forming station. The blank forming station includes a material clamping means which clamps and secures the raw edge of the material, which is the edge across the width between the selvage edges. The blank forming station further includes a blank sizing means which cooperates with the clamping means to draw material from the reserve or slack supply to form the desired size blank. This function also effectively serves to draw the trailing material through the inspection station. The blank thus sized is further clamped at the edge to be cut after which the material is then cut so that there is a substantially rectangular blank of cloth with two opposite edges selvaged and the other two opposite edges being raw or cut edges. In processing roll material into bed-sheets, for example, the raw edges are formed into hemmed edges. The material between the hemmed edges defines the length of the sheet, the material between the opposite selvage edges defining the width of the sheet. Thus, it may be said that the sheet blanks are cut to length. The width of such sheet blank is the width of the supply of material.

From the description below, it will be seen that the blank forming station embraces a novel concept which includes individual features which are novel to the art. Such novel features include a blank forming station which is adjustable with respect to the length of the blank cut. The width of the blank is the width of the roll material. The blank forming station, however, accepts all widths of material within the limits of the width of the structure. In addition, the blank forming station includes the feature of waste removal. This feature may be co-ordinated with the function of the inspection station and a counter, positioned between the inspection station and the cutting apparatus of the blank forming station. In its simplest automatic form, upon detection of a defect of at least a predetermined magnitude in the material drawn through the inspection station, means are provided to determine the location of the defect with respect to the cut edge on the roll. In other words, determination may be made as to whether or not there is sufficient material in front of the defect, i.e. between the cut or raw edge on the supply and the defect detected, to form a blank, and how much material must be drawn off from the closest cut edge to cut out the defect in the material, with minimum loss of material. This may be referred to as cutting a waste blank, which may be a short blank. In accordance with the invention herein, the waste blank is then automatically removed, and normal operation of the apparatus is automatically resumed. In one form of the apparatus, the drawing and cutting of the waste blank may be under manual control.

The novel method of sizing the to-be-cut blank introduces novel apparatus into the field and provides convenient preparation to a novel method of blank transportation. The novel method of sizing the to-be-cut blank and the novel method of blank transportation provides apparatus which uses a great deal less space than heretofore found necessary in presently known blank forming apparatus, forming blanks of comparable size.

The present apparatus employs hanging or draped blank transfer as opposed to flat blank transfer. Flat or open blank transfer requires a large structure and consumes great amounts of floor space. The size of the structure and/or apparatus heretofore used in automatic manufacture of relatively large flat articles, such as flat bedsheets, bed spreads, table covers and/or cloths, blankets and large bath towels was itself a limiting factor as respects to cascading the apparatus.

Draped blank transfer, which is the novel method of blank transfer taught herein, requires structure which is substantially smaller in size and takes up substantially less floor space then apparatus heretofore taught. The novel method of draped blank transfer makes practical other advances which include shuttle distribution of blanks and cascading or duplicating of sewing lines.

Generally, after the blank is produced the blank is transferred to a shuttle which, on a pre-programmed basis, selectively distributes the cut blank to one of a plurality of sewing lines.

In the preferred arrangement, shown below, one blank sizing and cutting device feeds cut blanks to a multi-unit blank distributing means which in turn sequentially feeds the blanks to one of the plurality of sewing lines. Timewise, it has been found that, at a reasonable operating speed, a bed-sheet blank can be sized and cut at least four times faster than the same blank can be hem folded and sewn into a substantially finished product. Thus, one arrangement includes a triple unit shuttle which, operating in a cycle, receives cut blanks from a blank sizing and cutting device and feeds such blanks sequentially to each of four sewing lines in predetermined sequence. This novel structure and method of utilizing a common blank sizing and cutting station for feeding a plurality of sew lines is practical only by reason of the novel method employed in the sizing operation and the novel method of blank transfer presented herein. The particular formation or plan of the preferred structure consumes substantially less floor space than would have been required if apparatus using flat or open blank transfer had been employed. Further, when a plurality of sewing lines are employed, this arrangement provides for depositing the finished flat articles in a common location.

Another arrangement provides for a split shuttle device with sew lines extending from both sides of the blank cutting assembly. In this arrangement, single unit shuttles, positioned on each side of the blank cutting device, alternately receive blanks from the cutting device and feed the received blanks to each of a plurality of sewing lines.

Since the sewing sequence preformed in the sewing line normally takes some four times longer than the blank cutting operation four sewing lines may be conveniently served by one blank cutting apparatus. However, the timing of the blank cutting operation may be speeded up or slowed down, as desired. In addition, the timing of the sewing process may also be changed, if desired. This may provide a different time relationship between the processing of the bulk material into cut blanks and the processing of the cut blank into a finished flat article.

In the alternate arrangement, i.e., the double ended form, waste disposal may differ somewhat from the preferred arrangement. Although material defects and/or waste detection may be accomplished in the same manner as described above, disposal of short blanks or waste blanks may be accomplished by cutting, the short blank and dropping the short blank onto the floor or into a chute or opening conveniently located below the lowest position of the sizing rod or bar, all to be described below.

The novel feature of apparatus which vertically depresses the material for drawing such material from a supply for forming a blank in the sizing operation and the transferring of the cut blank in a draped or hanging condition, is a breakthrough in the flat article manufacturing machinery field and permits creation of apparatus of practical size for automatic manufacture of flat articles, such as flat sheet, for example, from a bulk supply. The vertically depressed material sizing operation makes possible a blank sizing assembly which is relatively small in mass area and bulk, has a short throw or travel, operates at a relatively rapid rate and is easily and conveniently adjustable as respects to the size (length) of the blank produced.

Present apparatus which uses a flat or open draw operation for sizing a blank has a massive structure of great bulk, has a throw or travel which approximates the size of the blank produced, operates at a very slow rate and is difficult to adjust. Apparatus currently used for manufacturing flat sheets, for example is very massive, heavy and bulky. For example, apparatus required to flat draw a flat sheet blank is so large as to make distribution, by shuttle means, of cut blanks to a plurality of sewing lines impractical. The slow rate at which the flat draw sizing apparatus operates makes cascading or duplicating the sewing lines undesirable and impractical, from a time standpoint.

When one considers the full advantages of shuttle distribution of cut blanks to a plurality of sewing lines, the importance of vertically depressed material blank sizing and draped or hanging condition transfer of the cut blanks, becomes apparent.

It is an object of the present invention to provide a fully integrated automatic apparatus which automatically processes bulk material into finished flat articles utilizing the full potential of a sole blank sizing and cutting device by selectively feeding the blanks so provided to each of a plurality of sewing lines.

Another object is to provide automatic apparatus for processing bulk material into finished flat goods in which bulk material is drawn to size in a space smaller than the blank itself by a sizing bar.

Another object is to provide automatic apparatus for processing bulk material into finished flat goods in which the blank sizing and cutting device sizes the length of the blank and such sizing and cutting device is readily adjustable with respect to the length of the blank sized and cut.

Another object is to provide automatic apparatus for processing bulk material into finished flat articles in which a portion of the bulk material is drawn to size by clamping one end of the material, drawing a short section of the material across a channel and vertically depressing part of the drawn section of material into the channel to draw material from the bulk supply.

Another object is to provide integrated apparatus for automatically processing bulk material into finished flat articles in which waste blanks are automatically disposed of.

Another object is to provide fully integrated apparatus for automatically processing bulk material into finished flat articles in which the material so sized is drawn into a drape or U shape before being cut.

Another object is to provide fully integrated apparatus for automatically processing bulk material into finished flat articles in which the cut blank is fed to a shuttle depository.

Another object is to provide fully integrated apparatus for automatically processing bulk material into finished flat goods in which the cut blank is fed to a shuttle depository and the cut blank is transferred in substantially fully draped or hanging condition.

Another object is to provide integrated apparatus for automatically processing bulk material into finished flat goods in which the blank sizing and cutting device feeds the cut blanks to a shuttle in a cyclic sequence and the shuttle transfer the cut blanks to each of a plurality of sewing lines, in cyclic sequence.

Another object is to provide a fully integrated apparatus for automatically processing bulk material into finished flat goods in which the sizing is accomplished by vertically depressing the material by a sizing bar into a "U" configuration and the cut blank is transferred while in a "U" or hanging condition.

Another object is to provide integrated apparatus for automatically processing bulk material into finished flat articles in which the cut blanks are transfered to a sewing line and the cut blanks are hem folded, hem sewn and hem sewn closed while the material so processed is in motion.

These and other objects will become apparent from reading the following detailed description with reference to the accompanying drawings in which:

FIGURE 1 is an overall perspective view of the preferred embodiment of the apparatus;

FIGURE 1a is a block diagram helpful in understanding the distribution cycle of the apparatus of FIGURE 1;

FIGURE 2 is an overall perspective view of an alternate form of the apparatus;

FIGURE 2a is a block diagram helpful in understanding the distribution cycle of the apparatus of FIGURE 2;

FIGURE 3 is a more detailed view of the blank sizing and cutting device;

FIGURES 4, 5 and 6 are cross-section drawings of the blank sizing and cutting device in sequential operation;

FIGURE 7 is a cross-section taken along line B—B of FIGURE 1;

FIGURE 8 is a cross-section taken along line C—C of FIGURE 1;

FIGURE 8a is a detailed drawing of part of FIGURE 8;

FIGURE 9 is a cross-section taken along line D—D of FIGURE 1;

FIGURE 10 is a cross-section taken along line E—E of FIGURE 1;

FIGURE 11 is a cross-section taken along line F—F of FIGURE 1;

FIGURE 12 is a cross-section taken along line G—G of FIGURE 1;

FIGURE 13 is a cross-section taken along line H—H of FIGURE 1;

Figure 14:
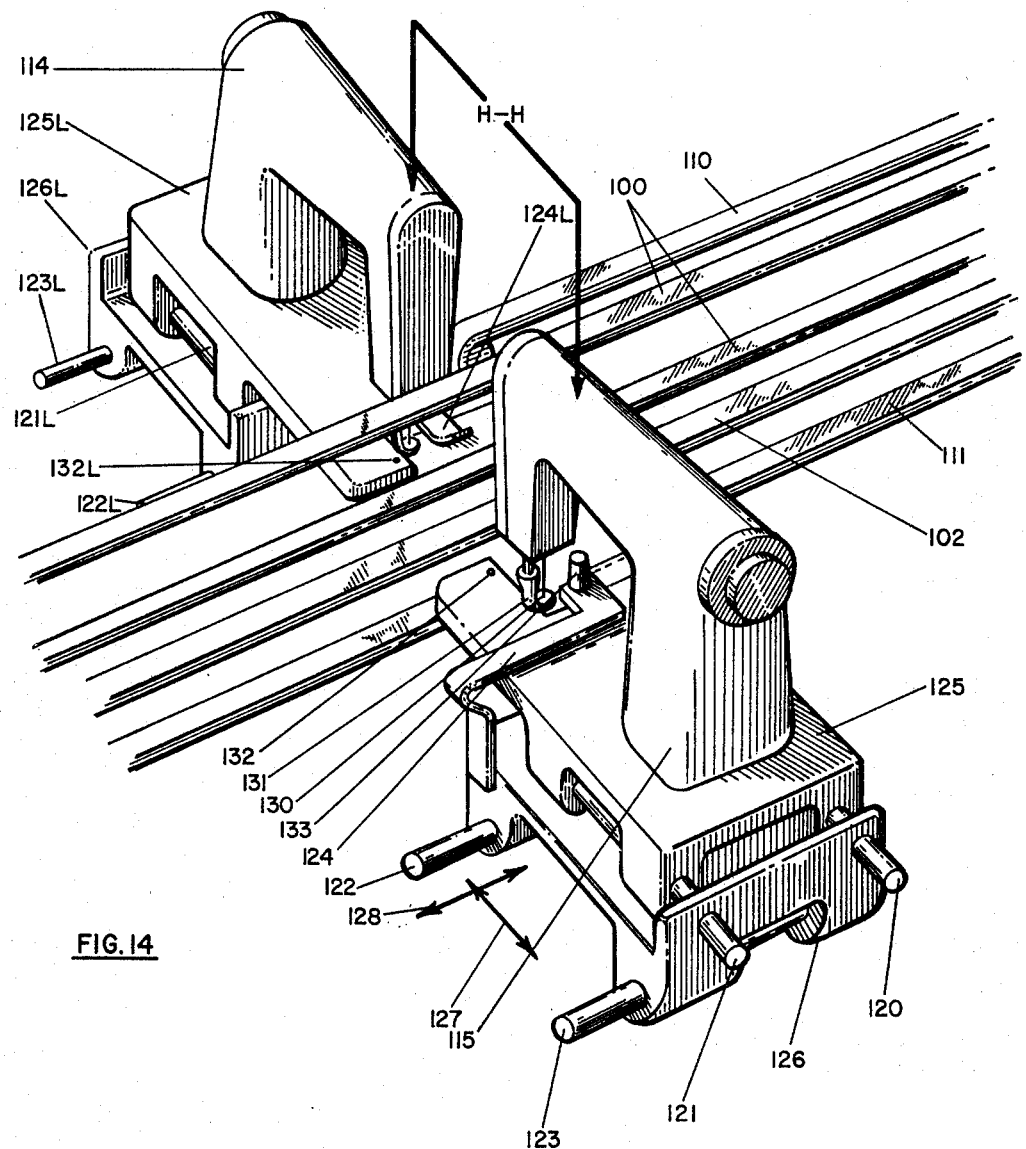
FIGURE 14 is a detailed view of the hem-close sewing machine with X and Y coordinate travel.

Referring to FIGURE 1 in more detail, the overall perspective view of the preferred embodiment shows a unitary triple section shuttle, each section of which receives a cut blank from a common blank sizing and cutting device. The triple section shuttle rides back and forth on tracks or rails as a single component and after having received a cut blank transfers the cut blank to one of four sewing lines, in a predetermined sequence.

It should be understood that the size and bulk of the apparatus depends upon the article which is processed or manufactured by the apparatus. If, for example the finished flat article is a bed sheet, the size of the bulk material would be relatively large, width-wise. The width of the apparatus would be sufficiently large to handle the bulk material laid flat, width-wise. The apparatus includes a material blank sizing and material blank cutting device. The term blank or cut blank refers to a unit piece of material severed from the bulk supply and having length and width. One end of the bulk materials is presented to the blank sizing device and a portion of the material is drawn off the bulk supply. When a predetermined amount of material (lengthwise) is in the blank sizing device, the material is cut and gains its own identity. This is referred to as a blank or cut blank. The cut blank has a width which is a function of the width of the bulk material and has a length which is a function of the amount of material drawn into the blank sizing device. The length of the cut blank is sufficiently long so that the finished flat article may be formed with hemmed edges on its length.

The bulk material may be in the form of a roll or reel of material or a bolt of material. The material itself may be woven or unwoven having finished edges along its length. The material may be any type pliable cloth or fabric whether natural, synthetic or mixed normally used for the material content of the finished flat article so produced.

Referring to FIGURE 1, bulk web material is illustrated as a roll of material 20 which has its longitudinal edges 21 selvaged. The roll 20 may be placed on a bed of rollers 22 on which the roll of material will rotate as the material is drawn from the roll. The material passes between a clamped pair of driven rollers 23 which, driven by a motor (not shown) rotate in opposite directions respectively and draw or pull the material from the roll in the direction of the arrows. The material is loosely depostied in the reserve area 24 in a loosely folded supply. This loose supply is preserved by replenishing the supply periodically as such loose supply is depleated.

In order to align or straighten the material as it is drawn from the reserve area and to avoid gross wrinkles, the material is passed over a high roller 25 and under and over the smoothing bars 29 and 30, respectively. The material passes across an inspection area 32 which includes a material scanning device 31. The material scanning device may be in the form of a light source and a photosensitive device between which the material is drawn. The member 31 may represent a source of light positioned above and directed onto the upper surface of the material. The light source is sufficiently long so as to illuminate a strip across the width of the material. Directly under the material 20, substantially within the area of the illuminated strip is a photo-sensitive means which may be one or more photo-cells, for example, which responds to the intensity of the light passing through the material.

If, for example, there should be a hole in the material passing between the light source and the photo-sensitive means the light intensity passed to the photo-sensitive means through such hole will increase and such increase in intensity will be detected by the photo-sensitive means, thus indicating a defect in the material. If, for example, there should be a joining seam or soiled area in the material, the light passing through such seam or soiled area will decrease in intensity and such decrease in intensity will be detected by the photo-sensitive means thus indicating a defect or soiled area in the material.

The material is then passed over the visual inspection of the inspection area 32 and thence between the pair of gripper rollers 34–35. The gripper rollers 34–35 include a drag means which maintains the material taut on the "downstream" side of the gripper rollers during the blank sizing operation and prevents roll-back or back flow of the material when the cut edge of the material is not otherwise secured.

The material is then passed between the cutting or shear blade 33 and the shear plate or anvil 39 thus entering the blank sizing and blank cutting apparatus. FIGURES 3, 4, 5 and 6 illustrate clearly the details of the blank sizing and blank cutting apparatus and show pictorially the operational positions of the components of the blank sizing, blank cutting and initial blank transfer apparatus.

Referring in particular to FIGURES 3, 4, 5 and 6, the material 20 passes between the gripper rollers 34–35 and between the shear blade 33 and shear plate 39. The blade 33 is illustrated in its "up" position in FIGURES 3, 4 and 5. The blade 33 is mounted between the vertical members 40 and 41 and the blade is depressed, as seen in FIGURE 6 by a force applied by, for example, a spring loaded air cylinder which may be mounted in the members 40 and 41. Two pair of endless, separable transfer belts 42–43 and 44–45 are illustrated both separated or open in FIGURE 4 to permit passage of a draw clamp 49 therethrough.

When the draw clamp 49 is extended, from its retracted position, toward the edge of the material at the opposite side of the sizing chamber the jaws are open. The lower jaw contacts the spring biased retractable shear plate 39 and urges the shear plate toward the gripper rollers 34–35 thus exposing an amount of the material 20, adjacent the cut edge, sufficient for the jaw of the draw clamp 49 to securely grasp.

The draw clamp 49 may be in the form of an elongated clamp having wide jaws, extending substantially along the width of the exposed material 20. Closure of the jaws may be effected by the drawing force of one or more springs, such as 46, upon release of the upper jaw by the cylinder 47. The upper jaw is coupled to the cylinder 47 by the actuating rod 48. Actuation of the rod 48 by the cylinder may be programmed or may be made responsive to the position and phase of the operational cycle of the sizing and cutting apparatus.

The draw clamp may be extended and retracted away from the retractable shear plate 39 by means of a cylinder arrangement suitably connected to the draw clamp 49.

As seen in FIGURE 3, a sizing bar 50 is mounted between a pair of vertical members 53 and 56 (seen in FIGURE 1). The upper extremes of the vertical members 53 and 56 telescope into the vertically mounted members 51 and 52, respectively. Bar 50 is coupled between the lower extremes of the members 53 and 56. A pair of driving means, such as air cylinders is represented at 54 and 55. The air cylinders are illustrated as double action cylinders and serve to raise and lower the sizing bar 50 to a stop, represented at 59. The stop 59 may be adjustable in increments, as desired. If the stop positions, represented by the holes in the member 51, are one-half inch apart, the adjustments will be made in one-inch increments, for example. The pin 59 will provide a stop for the down travel of the telescoping or trombone assembly 51–53. Another such stop (not shown) will be provided for the telescoping assembly 52–56.

After the draw clamp 59 closes on the material exposed by the retracted shear plate 39, the draw clamp 49 is drawn back or retracted through the open or separated transfer belts, past the raised sizing bar and to a position as illustrated in FIGURES 3 and 5 thus drawing a portion of the material 20 into the blank sizing and blank cutting apparatus.

As the draw clamp retracts the material is drawn from the loosely folded reserve 24.

It should be noted that the amount of material 20 that is drawn into the sizing apparatus by the draw clamp is substantially less than the length of the blank therein sized. As will be seen, the greater part of the blank so sized is drawn into the sizing chamber by the vertical descent of the sizing bar 50 onto the upper surface of the material 20, as is clearly illustrated in FIGURES 5 and 6.

As the draw clamp begins its return travel, after clamping the material 20, the biased retractable shear plate 39 is urged back into position so as to function with the blade 33 for shearing the material 20, after the sizing of the blank has been effected.

FIGURES 1, 2 and 3 illustrate a telescope or trombone type extension for moving the draw clamp 49, however, this may be done by any desired arrangement which provides the function.

After the draw clamp is retracted, the transfer belts 44–45 close gripping the material 20 and the sizing or drive bar 50 descends on the material 20. This effectively draws more material from the reserve supply at 24, the sizing bar lowering until stopped by the stop 59. At that position in the descent of the sizing bar 50 the desired length of material is positioned between the draw clamp 49 and the cutting apparatus 33–43.

When the descent of the sizing bar 50 is stopped by stop 59, the transfer belts 42–43 close on the material 20 and the blade 33 descends thus cutting the material and forming a cut blank of predetermined size. The sizing bar 50 and the blade 33 both raise and the cut blank may then be transferred out of the sizing and cutting apparatus. Transfer is accomplished by rotating each belt of each pair of transfer belts in opposite directions.

Thus, it will be seen that a pre-sized blank has been cut by drawing a portion of the material out flat and depressing the body portion of the blank into a sizing chamber by use of a vertically descending sizing bar. In addition, the cut blank is prepared for transfer in a hanging condition securely clamped between pairs of transfer belts inside both raw edges.

As seen in FIGURE 1, the shuttle unit and sewing lines, to be later described, are off to one side (for example, the right hand side) of the blank sizing and cutting apparatus. These components could be located to the other side of the blank sizing and cutting apparatus, if desired. How-

CYCLE OF OPERATION

| | One Cycle | | | | | | |
|---|---|---|---|---|---|---|---|
| | 1 | 2 | 3 | 4 | 5 | 6 | 7 |
| Draw clamp (49) | open stop retracted | open move retract short draw | close on edge move retract short draw | hold edge stop retracted | hold edge stop retracted | hold edge stop retracted | open stop retracted |
| Sizing bar (50) | up stop | up stop | up stop | up stop | descend move draw to size | down stop drawn to size | ascend move |
| Transfer belt (44–45) | open stop | open stop | open stop | close stop | close stop | close stop | close transfer |
| Transfer belt (42–43) | open stop | open stop | open stop | open stop | open stop | close stop | close transfer |
| Shear plate (39) | advanced stop | retract by jaw move | release move | advanced stop | advanced stop | advanced stop | advanced stop |
| Blade (33) | up stop | up stop | up stop | up stop | up stop | descend move | ascend move | ever, as illustrated, the transfer belts will normally transfer the blank out of the sizing channel 60 (see FIGURES 3, 5 and 6) to the right thus transferring the cut blank to or into a section of the shuttle, there waiting. In the event the cut blank is a waste blank (or short blank) the blank may be disposed of by transferring the waste blank off or out in the opposite (left) direction. Thus, a waste blank disposed of is provided. This may be accomplished by reversing the direction of rotation of the transfer belts.

In a normal cycle of operation the components of the sizing and cutting apparatus may follow a cycle such as set forth in the chart above, for example.

It will be appreciated that the longitudinal movement or throw of the draw clamp, 49 in one direction is substantially less than the length of the blank drawn and cut, and the vertical movement of the sizing bar, 50 in one direction is substantially less than one-half the length of the blank. Thus, when compared with currently used blank forming techniques, it will be seen that a great deal of floor space may be saved by using the principles disclosed herein for sizing and cutting blanks of material with a consequent diminution of the kinematic aspects of the system.

It will be further appreciated that the drawing, cutting and removal of a waste blank or short blank will follow a somewhat different cycle. In the process or cycle of drawing a waste blank, which may be a short blank, steps 1, 2, 3 and 4 may be substantially the same as those above. The amount of material drawn would be at least a minimum amount or length, sufficient at least to span between the two pair of transfer belts. If the amount of material to be drawn off to include the defect or soiled area detected is longer than the minimum length, the sizing bar may descend, as in step 5, the distance the sizing bar 50 so descends will be a function of the distance between the cut edge (held by the clamp 49) and the defect. Thus, step 5 may not fully be carried out so that step 6 may be advanced, with respect to the position of the sizing bar 50. After sufficient material has been drawn so that the defect so detected is in the area of the blank sizing apparatus, step 6 will be completed. Step 7 in terms will appear to be the same as shown above except the movement of the transfer belts will be in the reverse direction. Thus, the waste blank or short blank may be transferred out of the blank drawing and cutting apparatus and deposited as waste in a waste blank receiving unit, which may be a container or storage space.

In normal operation, a blank is transferred from the sizing and cutting apparatus to a section of the shuttle at high speed by transfer belts 42–43 and 44–45. Transfer of the blank from the shuttle section to a sewing line is also made at high speed (which is preferably the same speed as the initial transfer). After the blank has been fully transferred onto the sew line, the subsequent conveying speed of the blank may be changed to conform with the workspeed of the work performed on the blank. In the case of a sewing line the conveyance speed of the blank would be governed by the sewing speed of the sewing machines used.

The step-by-step cycle of operation may be self-actuating, that is, completion, or some pre-established fraction of completion, of one step actuates initiation of the next step. The draw clamp 49 may be longitudinally positioned by an air cylinder with a double acting piston. Initiation of travel of the sizing bar may be responsive to the position of the draw clamp while the travel of the sizing bar, both down and up may be a function of an air cylinder with a double acting piston. The adjustable stop, previously described may take any one of several forms, a typical arrangement having been shown and described.

The transfer belts are illustrated in pairs of belts, each belt of a pair of belts being driven in opposite directions. Thus, a blank clasped between such pair may be transported. For example, with respect to transfer belts 42 and 43 the top belt 42 may be driven counter clockwise and the lower belt 43 may be driven clockwise and a blank held between the belts would be transported into an aligned section of the shuttle. The belts may be driven by a motor through suitable gearing. The transfer belt driving means may be actuated in response to longitudinal alignment of corresponding pair of transfer belts (the transfer belts of the blank forming device and the transfer belts of a shuttle unit) and the cyclic position of the sizing bar 50. Thus, at the precise time in the cycle the cut blank may be transferred out of the sizing and cutting apparatus and into an aligned section of the shuttle.

It should be understood that the blanks which are sized and cut in a common source or apparatus are fed sequentially to a section of a triple section shuttle. The shuttle sections receive the cut blanks in predetermined sequence and distribute the blanks to each of four sewing lines in predetermined sequence. This sequence shall be discussed below.

The unitary shuttle is illustrated as three substantially identical, equally spaced sections, so spaced as to align with the equally spaced sewing lines. Each section of the shuttle includes two pair of transfer belts, one pair of transfer belts of a shuttle section being aligned with the transfer belt pair 42–43 and the other pair of transfer belts of the same section being aligned with the transfer belt pair 44–45 when that particular section is aligned with the sizing and cutting apparatus in the transfer direction.

The shuttle includes sections 61, 62 and 63 of which section 61 is illustrated in most detail. When the section 61 is aligned with the sizing and cutting apparatus transfer belts 64–65 essentially align with transfer belts 42–43 and transfer belts 69–70 essentially align with transfer belts 44–45. Belt pairs 64–65 and 69–70 are individually driven in the same direction as the corresponding belt of belt pairs 42–43 and 44–45 so that a cut blank may be transferred from the sizing and cutting apparatus transfer belt and received by the aligned transfer belts of the shuttle section.

Each shuttle section has a cut blank carry channel such as 71, which aligns with the blank drawing or sizing channel 60.

The driving means for the shuttle section transfer belts, drives such belts at exactly the same speed as the transfer belts of the sizing and cutting assembly. The shuttle transfer belt drive means may be made responsive to operation (rotation) of the sizing and cutting apparatus transfer belts.

The shuttle 61, 62 and 63 may be wheel mounted and ride on a track or pair of tracks, such as represented by the wheel 72 and tracks 73 and 74. To maintain their equally spaced positions the sections 61 and 62 are couple-separated by members 75 and 79 while sections 62 and 63 are couple-separated by members 80 and 81.

The pair of tracks 73–74 is sufficiently long to permit travel of the shuttle to accomplish the distribution sequence set up for total operation. An example of a distribution sequence will be described below.

After a cut blank has been transferred to and received by a shuttle section, the cut blank it then transferred to one of the four sewing lines, in sequence.

The four sewing lines are equally spaced and are substantially identical, each to the other. The sewing lines, generally labelled 82, 83, 84 and 85 are spaced so as to provide walking space between the lines.

In general, each sewing line is substantially identical, except for its position with respect to the sizing and cutting apparatus. Thus, only one sewing line, 82 will be described and such description will be assumed to describe the other three individual sewing lines.

Sewing line 82 generally includes two sets of two in-line folders, a pair of oppositely positioned stationary sewing machines, a pair of oppositely positioned traveling or movable sewing mechines and a plurality of pairs of transfer belts. The apparatus on one shelf or shoulder of a sewing line is essentially a mirror image of the apparatus on the other shoulder of the same sewing line. The space between the shoulders is a blank carry or blank transfer channel 89. Such channel aligns with a corresponding blank transfer channel of a shuttle section when a shuttle section is aligned with the sewing line.

A series of cross-section views across lines B—B, C—C, D—D, E—E, F—F, G—G and H—H are shown in the FIGURES 7, 8, 9, 10, 11, 12 and 13 respectively. Each view shows a cut blank 20B in hanging-transfer form supported by a rail on either side of the channel forming the edge of the shoulders of the sewing line. The edge portions of the blank are secured or clamped by pairs of transfer belts with the body of the cut blank hanging in the transfer channel 89. The cut blank 20B is shown in various stages of the transfer and sewing process, including hem folding with the final stage of hem close represented in FIGURE 13.

Returning momentarily to FIGURES 4, 5 and 6, looking at the transfer belts 43 and 45, it will be seen that shoulder edge members 90 and 91 are coupled to each belt respectively, the shoulder edge member rising essentially to the upper level of the transfer belt with which it is directly associated. As seen more in FIGURES 5 and 6, the shoulder edge members (which may be in the form of a rail or rod, as seen in FIGURES 7 through 13) provide an edge over which the blank 20B may be drawn, as in the case of edge 90 and essentially prevent pressure from being applied on the transfer belt surface, as in the case of both transfer belts 43 and 45 when the blank is depressed by the sizing bar 50.

As seen in FIGURE 1, the shoulder edge or rail 90 virtually mates with a shoulder edge member 92 in the aligned section of the shuttle. It will be seen that the shoulder rail 92 of the shuttle section also mates with the shoulder edge or rail 93 in the aligned sewing line such as seen in the aligned section 61, and the sewing line 83. Thus, the three shoulder segments (on one side of the channel) virtually combine when aligned to form one side of the transfer channel through which the blank is transferred while being processed. It was previously stated that the sewing lines are made up in halved mirror image thus shoulder rail, represented by 96 in FIGURES 7 through 13 extends along the opposite side of the cut blank transfer channel 89 (i.e. the mirror image of shoulder rail 93). This distance between the two shoulders of the sewing line is substantially less than the length of the blank so that a major portion of the blank hangs in the blank transfer channel.

Attention is now directed to the sewing line 82 in FIGURE 1 and the FIGURES 7 through 13 inclusive. It is apparent from the drawings already described that the cut blanks are held between two cooperating pair of transfer belts. The cut blank is held entirely along its width just inside the cut edges. This exposes a small portion of the cut ends of the blank, along the width. The center portion of the cut blank hangs loosely in a channel thus, the cut blank is transferred while in a three-dimensional condition. It is apparent that this manner of transfer of such cut blank takes up a great deal less planer space than required for flat or two-dimensional condition transfer.

In order that the cut blank may be rapidly deposited or transferred onto the sewing line, a sewing line includes a cut blank depository which is somewhat longer than the width of the widest cut blank processed by the apparatus. Along the shoulders of the cut blank depository are pairs of transfer belts which receive a blank from an aligned shuttle section, the blank traveling at high speed. This provides for rapid transfer of the cut blank from the shuttle section to the sewing line. It is also apparent that each shuttle section is of sufficient length to accept and hold the widest cut blank to be processed by the apparatus so that during travel of the shuttle a cut blank held by any section of the shuttle will be completely within the blank transfer channel of the shuttle section and under control of the shuttle section so carrying the cut blank.

At its cut blank acceptance point, the sewing line has a cut blank transfer channel which virtually mates with the cut blank transfer channel of a shuttle section when such section is aligned with the sewing line. One set or pair of transfer belts, on one shoulder of the sewing line such as 94–95 align with a set or pair of transfer belts 64–65 respectively on the corresponding shoulder of the shuttle section and the other set or pair of transfer belts on the other shoulder of the sewing line, such as 98–99 (98 is shown in FIGURE 1, 98 and 99 are shown in FIGURES 7 and 8) align with the pair of transfer belts 69–70 respectively on the other corresponding shoulder of the shuttle section when a section of the shuttle is aligned with the sewing line.

As seen in FIGURE 7, the shoulder rails 93 and 96 of the sewing line are positioned so that a cut blank transferred by the belt pairs 94–95 and 98–99 does not apply a down pressure on the lower belt of each pair. This cross-sectional view along line B—B of sewing line 82 shows the high speed transfer belt pairs 94–95 and 98–99 holding a cut blank 20B, near the cut edges, 20L and 20R respectively. The portion of the cut blank 20B on the inside of the transfer belt pairs drapes over the shoulder rails 93 and 94, the major portion of the body of the blank hanging in the transfer channel 89. The inside belt pairs 94′–95′ and 98′–99′ have been omitted for convenience. Those belt pairs are shown in FIGURES 1 and 8.

The transfer belts 94–95 and 98–99 may be driven or rotated in response to rotation of the transfer belts of the shuttle unit so transferring the cut blank in operation the aligned pairs of transfer belts cooperatively function to transfer the cut blank from the shuttle unit to the deposit area of the sewing line.

Overlapping the high speed transfer belt pairs 94–95 and 98–99 are two pair of transfer belts 94′–95′ and 98′–99′ positioned inside and paralleling the transfer belt pairs 94–95 and 98–99. The transfer belt pairs 94′–95′ and 98′–99′ extend along side the transfer belts 94–95 and 98–99 respectively and align with the sewing speed transfer belts 100–101 and 102–103 respectively.

In FIGURE 8, the belt pairs 94′–95′ and 98′–99′ are illustrated open so that the transfer belts 94–95 and 98–99 may transfer the cut blank completely onto the sewing line at a high speed. After the cut blank is fully deposited onto the sewing line, the high speed transfer belt pairs 94–95 and 98–99 stop and open and the slow speed transfer belt pairs 94′–95′ and 98′–99′ close and rotate thereby transferring the blank into the control of the sew speed belt pairs 100–101 and 102–103 at reduced speed.

The belt pairs 94′–95′ and 98′–99′ are driven at the same speed as the belt pairs 100–101 and 102–103.

It will be noticed in FIGURE 1 that there is full overlap with respect to the belt pairs 94–95 and 94′–95′ and the belt pairs 98–99 and 98′–99′. FIGURE 8 is a sectional view taken across line C—C of FIGURE 1 and particularly illustrates the transfer belts 94–95 and 98–99 holding the cut blank 20B with the transfer belts 94′–95′ and 98′–99′ open.

It will be noticed that on the left hand side of FIGURE 8, the open transfer belt pair 94′ and 95′ and the shoulder rail 93 are in close proximity to the closed transfer belt pair 94–95. Also, the open transfer belt pair 98′–99′ and rail 96 are shown somewhat removed from the transfer belt pair 98–99. Apparatus associated with the transfer belt 99′ and rail 96 is illustrated, in section view in FIGURE 8a showing how the transfer belts and the rails may be independently, laterally adjustable. In FIGURE 8a, the belt pair 98′–99′ is illustrated closed and the belt pair 98–99 is illustrated open.

The pulley 108, which is illustrated as a drive pulley, may include a hub 109 with a facing 116. The hub 109 may be keyed to the female member 117 of a spline coupling, the male member being 118. The spline meber 118 may be coupled to a drive means 134 via a set of mated bevel gears 135–136 and a drive shaft 137.

The pulley 108 may be laterally positioned along the spline member 118 by means of a threaded shaft 160 anchored in the frame of the sewing line, represented at 161. The threaded shaft 160 screws into the taped hole in an adjusted bar 162 which is coupled to the fact plate 116 of the pulley hub 109. The adjusting bar 142 extends to support the shoulder rail 96, the top of which is substantially at the height of the transfer belt 99'.

By turning the crank handle 164 in one direction, clockwise, for example, the threaded shaft 160 will pull the adjusting bar 162 toward the frame 161 thereby repositioning the pulley 108 and belt 99' as well as shoulder rail 96. The idler pulleys on the respective belts would also be adjustable, as well as the upper belt 98' of the pair. The idler plleys would not couple to a drive means 134.

Since the slow speed transfer belt pairs 94'–95' and 98'–99' align with the sew speed transfer belt pairs 100–101 and 102–103 the sew speed transfer belt pairs are also adjustable. However, for the sake of clarity, the adjustable feature is only illustrated associated with one belt, 99' and shoulder rail 96.

It may be desired that the size of the hem folded and subsequently sewn on a cut blank may change. This lateral adjustment of the low speed transfer belts and the cut blank shoulder rails provides adjustability with respect to making hems of the desired size. The lateral position of the components shown in cross-section in FIGURE 8 may transfer the cut blank with sufficient blank material 20L on the outside of transfer belts 94'–95' (100–101 on FIGURE 9) to permit the folding of a hem X inches in size or depth while the amount of material 20R on the outside of transfer belts 98'–99' (102–103 of FIGURE 9) permit the folding of a hem 2 X inches in size or depth.

According to the final product, the blank ends so hem folded and sewn may have the same size hems or have different size hems. The construction of the sew line is so made as to provide for laterally adjustable slow speed and sewing speed transfer belts and shoulder rails. Corresponding components on both sides of the sewing lines are adjustable.

Figure 15:
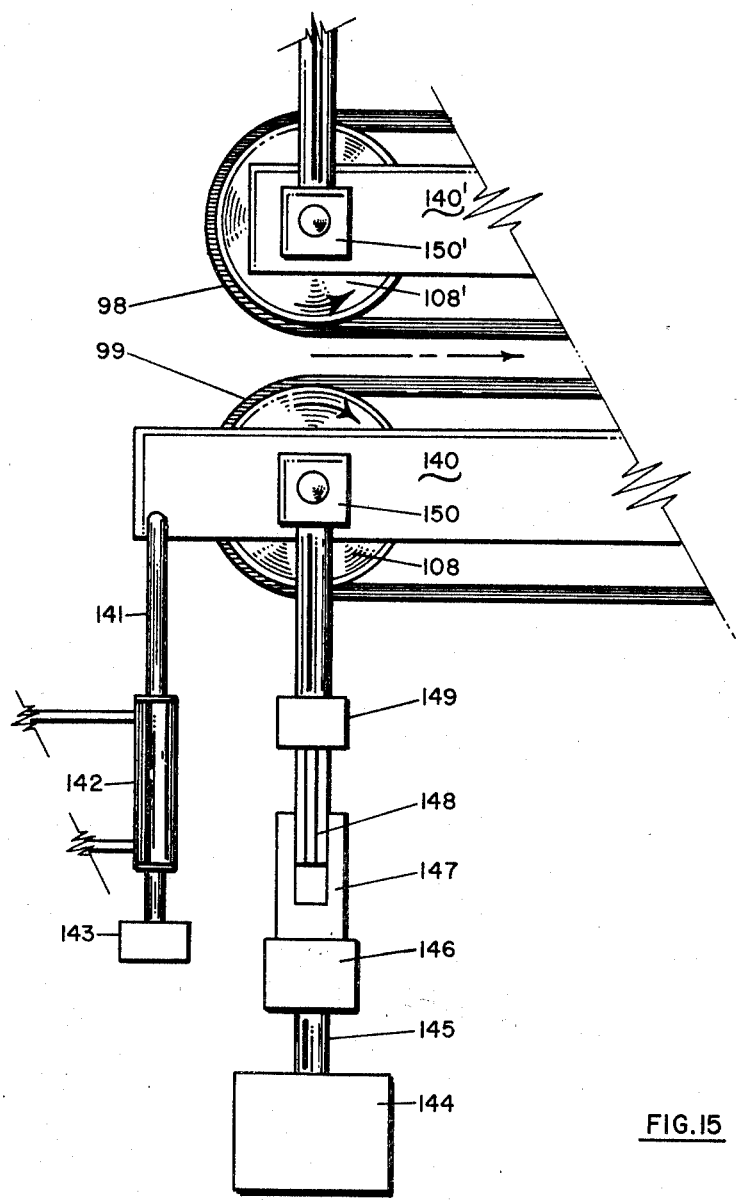
FIGURE 15 is a diagrammatic view of structure which may be used to raise and/or lower the transfer belt pairs.

Referring to FIGURE 15, apparatus for opening and closing a pair of transfer belts, is represented, along with a driving assembly for such transfer belt. The belt assembly including an endless belt 99 and a drive pulley 108 is represented as mounted in a frame 140. The frame is movable and its vertical position of a push rod actuatable arm 141 of an air cylinder 142.

When the push rod 141 is retracted, as represented, the lower belt assembly is in its low position. The upper belt assembly, including endless belt 98, pulley 108' and frame 140' is also preferably movable and would operate in conjunction with the lower belt assembly, but in reverse. Thus, the two belt assemblies (referred to as a belt pair) would open and close.

In order to drive the belt assembly a drive means 144, which may be a motor, is provided. The output of the drive means 145 is coupled to a lower universal joint 146. The universal joint 146 is coupled to the female section 147 of a spline coupling into which is slidably fitted the male section 148 of the spline coupling. An upper universal joint 149 is coupled between the male section 148 and suitable gearing 150, which is coupled to the drive pulley 108.

Drive means 144 may also be connected to the upper belt pulley 108' but suitable means would be interposed between the output 145 and the drive pulley 108' in the reverse direction from that direction in which pulley 108 (lower assembly) is driven.

After the cut blank is fully on the sew lines, the high speed transfer belt pairs 94–95 and 98–99 stop driving or transferring the cut blank and the slow speed transfer belt pairs 94'–95' and 98'–99' close on the cut blank. The high speed transfer belt pairs 94–95 and 98–99 open and the slow speed belt pairs rotate and transfer the blank to the sewing speed belts 100–101 and 102–103 which rotate in coordination with the slow speed transfer pairs. The belt pairs 94–95 and 98–99 may be made responsive to rotation of the transfer belts in the shuttle so that both sets of belts operate in unison when there is alignment between the shuttle section carrying the cut blank and the sewing line in order to effect transfer of a cut blank from the shuttle to the sewing line. However, cessation of rotation of the high speed transfer belt pairs of the sewing line may be made responsive to the position of the cut blank on the sewing line. Thus, at a point near the end of the high speed transfer belts a cut blank detection means may be positioned. Such detection means may be positioned so as to respond to the presence of a cut blank transferred by the high speed transfer belts so as to stop the high speed transfer belts. The same detection signal may be used to close the slow speed transfer belts after which the high speed belts may open and the slow speed belt pairs (including the sew speed belt pairs) may rotate thus, conveying the cut blank at another speed.

FIGURE 9 illustrates a cross-section view along the line D—D across the sewing line. It will be seen that the high speed transfer belts and the slow speed transfer belts do not appear, that the cut blank is being transferred by the sewing speed transfer belts 100–101 and 102–103. Also, it will be noted that the cut blank ends 20L and 20R, in FIGURE 9, on the outside of the transfer belts are each substantially longer than shown in FIGURE 7, for example. The ends 20L and 20R of the cut blank 20B are presented to folders 104 and 105 respectively (FIGURE 10) which folds each cut edge over itself. Associated with each folder may be a means for creasing such fold, such as a heated wheel, for example. As illustrated, each folder is substantially the same size, one is a mirror image of the other, thus the cut edges are equally folded up—in and over. This may be clearly seen in FIGURE 10 which is a cross-section view along line E—E.

As the cut blank, now folded on each end, is carried farther along the sewing line, each folded edge is presented to a second folder, 106 and 107 respectively. This may be seen in FIGURE 11 which is a cross-sectional view along the line F—F. It will be observed that the folder 107 is substantially larger than the folder 106 and in this respect, this deviates from an exact mirror image. In some cases, the folders 106 and 107 may be the same size. Under such conditions, the end portions of the blank 20L and 20R may be substantially the same size, thus providing the same size hem.

Considering FIGURE 12, the cross-section view across the line G—G is shown. When a transferred cut blank reaches this section of the sew line, both ends (20L and 20R) have been hem folded and such folds are passed through the work station of sewing machines. In order to more closely hold the hem folded sections of the blank, a holding belt 110 is employed in association with the sewing speed transfer belt pair 100–101 and a holding belt 111 is employed in association with the sewing speed transfer belt pair 102–103. Reference to FIGURE 12 will show a representation of a sewing machine 112 on the left-hand shoulder and 113 on the right-hand shoulder of the sewing line. The holding belts 110 and 111 are provided to insure against slippage and avoid twisting of the hem as the hem folded material is passed through the sewing station (the reciprocating needle passing through the material and into the throat aperture of the throat plate—not shown in detail) for stitching the hem. Reference to FIGURE 1 will show that the holding belts 110 and 111 are relatively short.

The sewing machines 112 and 113 are preferably conventional lock-stitch sewing machines. The machines are mounted, as shown in FIGURE 1, so that the folded material on each side of the blank coming out of the respective folder enters the sewing station of the respective sewing machine. The sewing machines are thus positioned in close proximity to the exit end of the last hem folder and/or creaser. It will be appreciated that the sewing machine 113 is a left-handed sewing machine.

The sewing machines 112 and 113 may be operated in response to the presence of a blank, as it exits from the folder. A presence detector may be used to detect the presence of the cut blank and the sewing machines 112 and 113 may be made to operate in response to the detection signal. Delayed cut off may be provided so that the entire folded edge will be sewn. The sewing machines 112 and 113 may also include a thread cutting device (not shown) which responds to cut off of the sewing machine and cut threads still connected between the cut blank and the sewing machine after the trailing edge of the cut blank passes through the sewing station and the sewing machine stops.

It will be appreciated that the sewing of the folded hem is accomplished with substantially straight line sewing. The sewing machines 112 and 113 are mounted on the opposite shoulders respectively of the sewing line and are positioned so that the hem folded edges of the cut blank are conveyed through the sewing stations of the respective sewing machines so that the inside edge of each hem is sewn along the entire hem, at substantially the same time, by the respective machines.

It should be kept in mind that high speed transfer of the cut blank from the sizing and cutting apparatus to the shuttle section permits rapid propagation of cut blanks. High speed transfer of the cut blank from the shuttle to a sewing line permits rapid unloading of the shuttle in preparation for continuation of the cycle of distribution. After a cut blank has been fully deposited onto the sewing line, the conveyance speed of the cut blank is changed so that the speed of travel of the blank during processing will conform to the stitching speed of the sewing machine.

In order to accomplish high speed transfer the sewing line includes a pair of high speed transfer belt pairs, which accepts transfer of the blank onto the sewing line. After the cut blank has been completely transferred onto the sewing line, the blank came under the control of transfer belt pairs which convey the blank along the sewing line during processing at the sewing speed.

In its preferred form, the high speed transfer belt pairs on the sewing line and the slow and sewing speed transfer belt pairs on the sewing line are separate cut blank transfer means, with the slow speed and sewing speed transfer belts physically separated. This provides for accepting a new cut blank at high speed transfer while another blank is being processed at sewing speed on the same sewing line.

Preferably, the drive means for driving the transfer belt pairs at the sewing speed, which may be a low speed, may be coordinated with the drive means for driving the sewing machines. This provides that the speed at which the cut blank is conveyed through the sewing station of the sewing machine may always be compatible with and/or correspond to the speed of operation (stitch speed) of the sewing machine.

In order to accomplish a continuously moving or flowing operation, the open ends of each hem (on 20L and 20R) are sewn closed while the blank is in transit. This is accomplished by providing a movable sewing machine on each side of the shoulder of the sewing line which moves along a predetermined path with the leading edge of the blank and sews the leading edge (from a standpoint of travel of the blank) of the hem closed. After sewing the leading edge of the open hem closed, the sewing machine is returned to its original position and moves along the same predetermined path with the trailing edge of the blank and sews the trailing edge of the hem closed.

In moving the sewing machine along a predetermined path, the sewing station moves along a predetermined path which is essentially across the hemmed portion of the blank, adjacent to the open end of the hem, and while passing over the hemmed portion the open end is sewn closed. The sewing machine is moved along the sewing line parallel with, in the same direction and at the same speed as the moving blank. At the same time, the sewing machine is also moved in the transverse direction so that the path of the sewing station is essentially a diagonal path across the shoulder of the sewing line but, with respect to the moving blank, follows a path which is substantially parallel to the leading edge of the blank.

FIGURE 14 shows a detailed view of the sewing machine mounting while FIGURE 13 is a cross-section view along the line H—H of FIGURES 1 and 14. FIGURE 1 illustrates the sewing machines 114 and 115 mounted on the shoulder of the sewing line. FIGURE 14 illustrates one mounting arrangement in which the sewing machine 115 is mounted on a bed 125 which is mounted on the sew travel rails 120 and 121. The rails 120 and 121 are mounted in a bed 126 which is itself mounted on the belt travel rails 122 and 123.

The bed 125 is movable transverse to the direction of travel of the blank (i.e. movable in the direction of the arrows 127) along the rails 120 and 121 thus moving the sewing machine 115 (including the sewing station shown as needle 130 and presser foot 131) in such direction.

The rails 120 and 121 are themselves mounted in the mounting, 126, thereby essentially making the bed 125 a "floating" member.

The mounting 126 is mounted on the rails 122 and 123 along which the mounting 126 (and the members so mounted on the mounting 126) is movable, in the direction parallel to the direction of travel of the blank (arrow 128). Thus, it will be seen that the sewing machine (and sewing station) is dual mounted, thus, permitting movement of the sewing machine (and sewing station) in a direction transverse to the direction of travel of the transfer belt pairs and parallel to the travel of the transfer belt pairs, the combination of the two directions being diagonal travel across the direction of travel of the transfer belt pairs.

A clamp 124 is clamped to the mounting 126 and moves with the mounting 126. The clamp 124 may include thereon a presence sensing or detection means, represented by 133, which may be responsive to the presence of a blank as the blank approaches the sewing station 130–131. Another blank presence detector is represented as 132, this detector being mounted in the bed 125.

In practice as the blank is conveyed out of the sewing station of the stationary sewing machines 112 and 113 (the hem having been sewn along the length) the leading edge of the blank approaches the sewing station of the prepositioned traveling sewing machines 114 and 115. The leading edge passes under the clamp 124 (124L, associated with sewing machine 114) and into the sewing station 130–131. Presence detector 132 (132L associated with sewing machine 114) is positioned so that when the presence of the blank is initially detected, the edge portion of the leading edge of the blank will be in the sewing station 130–131. Upon initial detection of the blank, a drive means for driving the base mounting 126 along the rails 122–123 in the direction of travel of the blank, and at the same speed, is actuated. At the same time, a drive means for driving the floating mounting 125 along the rails 120–121 in an outwardly direction, is actuated. As the sewing machine is thus driven, the sewing machine is also operated so that the leading edge of the sewn hem is sewn closed, the sewing machine across the hemmed blank.

After the leading edge of the hem is closed, the threads are cut by thread cutting means (not shown) and the sewing machine is returned to its original position (that is "up stream" and "in" with respect to its sewing path. (The sew path being essentially "down stream" and "out.")

When the trailing edge of the blank passes the detecting means 133 initial response by the detecting means 133 to absence of the blank actuates the driving means into operation so that the sewing machine is again driven "down stream" and "out" while sewing. The detecting means 133 is so positioned that when the initial response to absence of the blank is made, a portion of the blank adjacent to the trailing edge is in the sewing station. Thus, the trailing edge of the sewn hem is sewn closed.

Although each hem close sewing machine may be mounted as shown in FIGURE 14, each machine is independently responsive to its own associated detecting devices and each machine is independently adjustable and independently operable, with respect to the other. This independent feature provides for individual adjustment of each hem close sewing machine to insure absolute closing, of a hem, regardless of the size of hem sewn.

After each end of each hem is sewn closed, a thread cutting means (not shown) cuts the threads connected between the sewn hem and the sewing machine.

The sewn blank is transferred toward the end of the sewing line where the blank, now a finished flat article, may be removed or may be presented to a folding device.

The operation described herein above may have produced a flat bed sheet, depending upon the size (width) of the roll material 20, with respect to the selvaged edges and the length of the blank cut in the sizing and cutting apparatus.

It will be appreciated that the sewing lines 83, 84 and 85 may be substantially identical to the sewing line 82, just described. In actual construction the adjacent sewing lines would be spaced to provide walking room or space between adjacent lines to provide access to the apparatus.

In some cases, the individual sewing line may be identical with respect to position of the components. In other cases, the sewing machines on adjacent sewing lines may be offset with respect to the sewing lines so as to reduce the spacing between the sewing lines. Referring to FIGURE 1, the sewing machines 112b, 113b, 114b and 115b of sewing line 83 may be positioned further away from the shuttle than the sewing machines 112, 113, 114 and 115 of the sewing line 82. Thus, the back-to-back positioned machines 112 and 114 of sewing line 82 and 113b and 115b of sewing line 83 would then be offset with respect to each other.

In order to provide an apparatus in which a common blank sizing and cutting device serves a plurality of sewing lines through a multi-section shuttle, the various components are operated in coordination with each other on a preprogrammed basis. Referring particularly to the arrangement in FIGURE 1, the triple section shuttle moves as a single unit, all sections moving in unison.

The distribution sequence may best be described with reference to FIGURE 1a which is a block diagram of the arrangement illustrated in FIGURE 1. Block 10 represents the combined, storage, inspection and blank sizing and cutting apparatus with the broken line blocked area labeled 1 representing the cut blank output apparatus. Blocks 2, 3 and 4 represent the shuttle sections 61, 62 and 63 respectively which are space-coupled by the members 75 and 79 (blocks 2 and 3) and members 80 and 81 (blocks 3 and 4). The rails 73 and 74 on which the shuttle unit rides, are also represented.

The blocks 5, 6, 7 and 8 represent the sewing lines 82, 83, 84 and 85 respectively.

From the cut blank distribution cycle chart below, it will be apparent that the preferred arrangement will produce a finished article at a rate corresponding to the rate of production of the cut blanks.

CUT BLANK DISTRIBUTION CYCLE FOR FIGURE 1

| ←——————ONE—————————————CYCLE———————————→ |
|---|

| Transfer 1-2 | S H I F T | Transfer 1-3 | S H I F T | Transfer 1-4 2-5 3-6 | S H I F T | Transfer 1-3 4-8 | Transfer 3-7 | S H I F T | Transfer 1-2 |
|---|---|---|---|---|---|---|---|---|---|

Briefly, section 2 will align with block 1 and a cut blank will be transferred from block 1 to block 2. The shuttle will shift to align section 3 with block 1 and a cut blank will be transferred to block 3. Another shift will align section 4 with block 1 and as a cut blank is transferred from block 1 to block 4, the cut blanks in blocks 2 and 3 are also transferred to the sewing lines 5 and 6 respectively. Another shift aligns section 3 with block 1 and a cut blank is transferred from block 1 to block 3 and at the same time the cut blank in block 4 is transferred to sewing line 8. In the next interval, without further shift, the cut blank in block 3 is transferred to sewing line 7. The shuttle is then shifted to align the section or block 2 with block 1 thus, terminating a full cut blank distribution cycle.

FIGURE 2 illustrates an alternate layout in which a common cut blank supply apparatus feeds four substantially identical sewing lines in which two sewing lines are on each side of the cut blank supply apparatus. The layout of the alternate arrangement differs from the preferred arrangement in that the sewing lines are offset in pairs to opposite sides of the blank sizing and cutting apparatus.

Essentially, the material supply apparatus, the draw out and the sizing and cutting apparatus are substantially the same as described above, and is identically labeled. The individual sewing lines are substantially the same as the sewing line 82, described above. It will be appreciated that the preferred arrangement has a layout in the form of a modified "L" while the alternate arrangement has a layout in the form of a double headed "T." The blank distribution component is a two section shuttle which is split with one shuttle section on each side of the cutting apparatus. Each shuttle section moves independently of the other, but each are coordinated in the cycle of distribution for a smooth flowing operation.

The operation of the transfer belt pairs of the cutting apparatus is somewhat different from that described above in that distribution of the cut blank from the cutting apparatus is made to both sides of the cutting apparatus, as opposed to distribution of the cut blanks through the same side or output described with reference to FIGURE 1.

The cycle of operation of the sizing and cutting apparatus of the alternate arrangement includes, the sizing and cutting of one blank and transferring that blank out of the apparatus by the transfer belt pairs in one direction, for example, to the right, and the sizing and cutting of the next blank and transferring that next blank out of the apparatus by the transfer belt pairs in the other direction, for example to the left.

With such distribution, operation of the transfer belt pairs of the cutting apparatus would alternately be driven in the opposite directions for effectively reversing the direction in which consecutive cut blanks are transferred, i.e. alternately transfer one blank out through one side of the transfer channel and then transfer the next blank out the other side.

With a dual directional output, the waste blank and short blank removal includes the drawing and cutting of the waste blank and removal of the waste or short blank by dropping the waste or short blank into a waste blank or short blank retainer or disposal which is substantially below the sizing bar.

Although the function of the shuttle units of the apparatus illustrated in FIGURE 2 is substantially the same as that described above with reference to FIGURE 1, that is to receive cut blanks from the sizing and cutting apparatus and to distribute the cut blank to the sewing lines, the distribution sequence and distribution cycle of the alternate arrangement is somewhat different than that described above.

The shuttle is a two section, split component with one section on each side of the blank sizing and cutting apparatus. Shuttle section 66 travels on the rails 68 and 76, and serves the sewing lines 82a and 83a. Shuttle section 67, on the other side of the cutting apparatus travels on the rails 77 and 78, and serves the sewing lines 84a and 85a.

The sewing lines 82a, 83a, 84a and 85a of FIGURE 2 are each substantially the same, structurally, as the sewing line 82 described above. Functionally the sewing lines of FIGURE 2 are also the same as the sewing line 82 described above but, it will be appreciated that certain of the individual operations of the sewing lines 84a and 85a are reversed since the cut blanks transferred or conveyed along the sewing lines 84a and 85a are conveyed in the opposite direction.

Since the sewing lines of FIGURE 2 are structurally the same as the sewing lines of FIGURE 1 then the cross-section views of FIGURES 7 through 13 inclusive may also be the cross-section views of the sewing line 82a across the lines B—B, C—C, D—D, E—E, F—F, G—G and H—H respectively.

Considering the difference in the layout of the preferred arrangement and the alternate arrangement it will be apparent that the delivery point of the finished product produced by the apparatus in preferred arrangement will be made at a substantially common terminal (all at the same side) while delivery point of the finished product produced by the apparatus in the alternate arrangement will be split.

With respect to the blank sizing and cutting apparatus, a change in the cycle of operation may include operating the apparatus on a two-phase multi-step cycle. The first phase may include the drawing, sizing and cutting operations above described and the transfer or conveyance of the cut blank in one direction while the other phase may include identical drawing, sizing and cutting operations with conveyance of the cut blank in another direction.

Transfer of one cut blank may be made to shuttle section 66, for example and transfer of the next cut blank may be made to shuttle section 67, for example.

FIGURE 2a represents in block diagram, the layout of the apparatus illustrated in FIGURE 2. One distinguishing feature is that the shuttle apparatus is a dual unit, and each section (2a and 3a) moves individually along the respective pair of rails 68–76 and 77–78.

A cycle of distribution for the apparatus in FIGURE 2 (and FIGURE 2a) may differ somewhat from that proposed for the apparatus in FIGURE 1 (and FIGURE 1a). A typical programmed cycle for the apparatus in FIGURE 2, referred to the block diagram of FIGURE 2a may begin with both sections aligned with the cut blank output device (cut blank transfer channel). As described, the cut blank transfer belt pairs of the cutting apparatus will alternately reverse its direction of output so that cut blanks will be fed alternately to block 2a then to block 3a.

Thus, a typical cut blank distribution cycle, starting the shuttle sections both positioned and aligned with the cut blank transfer channel, as represented in FIGURE 2a, may be as follows:

CUT BLANK DISTRIBUTION CYCLE FOR FIGURE 2

| ←——ONE——— | | ———CYCLE——— | | | | ←—→ | ———CYCLE——— | | → |
|---|---|---|---|---|---|---|---|---|---|
| Transfer | Shift | Transfer | Shift | Transfer | Shift | Transfer | Transfer | Shift | Transfer |
| 1–2a | 2a–8 | 1–3a | 3a–6 | 1–2a | 3a–1 | 1–3a | 1–2a | 2a–8 | 1–3a |
| (3a–5) | | 2a–8 | 2a–1 | 3a–6 | | 2a–7 | 3a–5 | | 2a–8 |

The driving means for driving the various transfer means may include a motor and suitable gearing or chain or belt drive means. Individual motors may be used to drive individual components or when the unitary structure permits, a common drive means may be used to drive several components.

It may be desired to add a flat article folding device onto the respective sewing lines to fold the finished article. One folding device that may be used is taught in the co-pending application. Ser. No. 547,063 by Lynn Alford filed April 11, 1966, under the title, "Method and Apparatus for Folding Sheets" and assigned to the same assignee as the present application.

What is claimed is:

1. Apparatus for successively forming predetermined size blanks of limp material from a supply of limp material including;
   means for storing said supply of material from which successive portions may be drawn,
   means for separating successive portions of said material from said supply for forming blanks of said limp material of predetermined size, said separating means including;
   means for clamping the edge of said material for drawing a portion of the material from said supply,
   a channel over which a first portion of said material is drawn, said channel including
   a first shoulder and a second shoulder defining said channel,
   means for advancing said clamping means across said channel to a first position for securing the edge of said material,
   means for withdrawing said clamping means back across said channel to a second position for drawing said portion of said material over said channel,
   endless belt means on each of said first and second shoulders and including means for positioning said belt means in a first position for securing a portion of said drawn portion of said material to each of said shoulders and
   means for positioning said belt means in a second position for permitting passage of said clamping means across said channel
   a bar adapted to be lowered into and raised above said channel,
   elevator means for raising and lowering said bar,
   said bar and said elevator means operated in conjunction with said clamping means for lowering said bar into said channel for forcing part of said first portion drawn from said supply into said channel for drawing a second portion of said material from said supply and
   means for separating the portion of said material so drawn into said separating means for forming a blank of limp material.

2. Apparatus for successively making hemmed flat articles from a supply of material having finished edges along the longitudinal edges comprising;
- a supply of material from which successive portions may be drawn,
- means for separating successive portions of predetermined size of said material from said supply for forming blanks of said material of predetermined size including;
- a sizing channel having opposite shoulders and adjacent walls, said walls spaced a first distance apart and said channel having a depth at least substantially equal to one half the length of said blank,
- means for clamping the edge of said material between the finished edges thereof and for drawing a first portion of said material from said supply across said sizing channel, the length of said first portion being longer than said first distance,
- a sizing bar adapted for descending into said sizing channel and positioned above said first portion of said supply so drawn across said channel,
- means for lowering said sizing bar into said channel to a predetermined distance for drawing a second portion of said material from said supply across one of said shoulders into said channel,
- means for separating the material drawn across one of said shoulders from said supply for forming a blank of said material, the width of said blank defined by the said finished edges and the length of said blank defined by the edge of said material so clamped by said clamping means and the edge separated from said supply by said separating means,
- means on each of said shoulders for securing said blank adjacent to the edges of said blank to said shoulders for transferring said blank in a direction transverse to the direction said material was drawn for forming said blank, each said means for securing including,
- a pair of endless belts positioned in a first position for securing said blank adjacent the edges between the finished edges to said shoulders,
- means for positioning said pair of endless belts in a second position for permitting passage of said clamping means over said shoulders of said channel and
- means for rotating each endless belt when said endless belt is in said first position for conveying said blank through said channel,
- a work line having opposite shoulders and adjacent walls said walls being spaced for forming a blank transfer channel, said blank transfer channel generally corresponding in size to said sizing channel,
- means along each of said shoulder of said work line for receiving and conveying said blank along said work line through said blank transfer channel with the respective edges on the respective shoulders of said transfer channel,
- folding means on each of said opposite shoulders of said work line for progressively hem folding the respective edges of said blank as said blank is conveyed along said work line,
- means on each of said opposite shoulders for progressively securing the respective folded edges of said blank as said blank is conveyed along said work line,
- means on each of said opposite shoulders for closing the leading edge of the respective hemmed edges as said blank is conveyed along said work line, and
- means on each of said opposite shoulders for closing the trailing edge of the respective hemmed edges as said blank is conveyed along said work line.

3. Apparatus for successively making hemmed flat articles from a supply of material having finished edges along the longitudinal edges comprising;
- a supply of material from which successive portions may be drawn,
- means for separating successive portions of predetermined size of said material from said supply for forming blanks of said material of predetermined size including
- a sizing channel having opposite shoulders and adjacent walls, said walls spaced a first distance apart and said chanel having a depth at least substantially equal to one half of the length of said blank,
- means for clamping the edge of said material between the finished edges thereof and for drawing a first portion of said material from said supply across said sizing channel, the length of said first portion being longer than said first distance,
- a sizing bar adapted for descending into said sizing channel and positioned above said first portion of said supply so drawn across said channel,
- means for lowering said sizing bar into said channel to a predetermined level for drawing a second portion of said material from said supply across one of said shoulders into said channel,
- means for separating the material drawn across said one of said shoulders from said supply for forming a blank of said material, the width of said blank defined by the said finished edges and the length of said blank defined by the edge of said material so clamped by said clamping means and the edge separated from said supply by said separating means,
- means on each of said shoulders for securing said blank adjacent to the edges of said blank for transferring said blank in a direction transverse to the direction said material was drawn for forming said blank, each said means for securing including
- a pair of endless belts positioned for holding said blank adjacent the edges between the finished edges and
- means for rotating each endless belt of each pair in opposite directions for conveying said blank through said channel,
- a work line having opposite shoulders and adjacent walls said walls being spaced for forming a blank transfer channel, said blank transfer channel generally corresponding in size to said sizing channel,
- means along each of said shoulders of said workline for receiving and conveying said blank along said work line through said blank transfer channel with the respective edges on the respective shoulders of said transfer channel,
- folding means on each of said opposite shoulders of said work line for progressively hem folding the respective edges of said blank as said blank is conveyed along said work line,
- means on each of said opposite shoulders for progressively securing the respective folded edges of said blank as said blank is conveyed along the said work line,
- means on each of said opposite shoulders for closing the leading edge of the respective hemmed edges as said blank is conveyed along said work line,
- means on each of said opposite shoulders for closing the trailing edge of the respective hemmed edges as said blank is conveyed along said work line, and
- shuttle means having opposite shoulders and adjacent walls, said walls being spaced for forming a blank holding channel, generally corresponding in size to said sizing channel for receiving said blank from said securing means of said sizing channel and for transferring said blank to said means for receiving and conveying of said workline.

4. Apparatus for successively making hemmed flat articles from a common supply of material having selvages along the longitudinal edges in which a common supply apparatus feeds pre-cut material blanks of predetermined size to each of a plurality of worklines in sequence including:
- a supply of material from which successive portions may be drawn, means for separating successive portions of said material from said supply for forming blanks of said material of predetermined size, said separating means including;

a sizing channel having opposite shoulders and adjacent spaced walls and having a depth at least one half the length of said blank, a draw clamp for grasping the material adjacent the exposed edge of said supply and for drawing a first portion of said supply across said sizing channel, said portion being substantially shorter than the length of said predetermined size, a sizing bar adapted to be lowered into and raised above said sizing channel for drawing a second portion of said supply into said separating means upon being lowered into said channel on the surface of said first portion for positioning a predetermined length of said material in the said sizing channel, and shearing means for separating the material in said sizing channel from said supply for forming a blank of predetermined size, the length of which is defined by the edge grasped by the draw clamp and the edge cut by said shearing means and the width of which is defined by the selvages along the opposite longitudinal edges, means on each of said opposite shoulders for clamping the blank adjacent each edge defining the length of said blank and for transferring said blank with a portion of said blank hanging in said channel, shuttle means for receiving said blank so transferred out of said sizing channel, said shuttle means including, a transfer channel having opposite shoulders and adjacent spaced walls and substantially corresponding in size to said sizing channel, means on each of said opposite shoulders of said transfer channel for receiving the blank so transferred while maintaining the blank in a hanging condition and, means for transporting said shuttle in a direction transverse to the direction of transfer of said blank from said sizing channel for delivering said blank to a selected workline of said plurality of worklines.

5. Apparatus for successively making hemmed flat articles as in claim 4 and said means for separating further includes elevator means for raising and lowering said sizing bar, and stop means for defining the lowest position to which said sizing bar may be lowered into said channel.

6. Apparatus for successively making hemmed flat articles as in claim 4 and said means for separating further includes elevator means for raising and lowering said sizing bar, stop means for defining the lowest position to which said sizing bar may be lowered and means for adjusting said stop means for adjusting the depth of travel of said sizing bar.

7. Apparatus for successively making finished sheets from a supply of limp material having selvages along the longitudinal edges in which a common supply apparatus feeds limp material blanks of predetermined size in sequence to each of a plurality of sew lines comprising;

a supply of limp material from which successive portions may be drawn, means for forming blanks of said material of predetermined size including, a draw clamp for clamping the edge of said material between the selvages thereof and for drawing a first predetermined portion of said material across a channel, a channel having opposite shoulders and adjacent spaced walls said channel being substantially narrower than the length of said blanks of said predetermined size and having a depth of at least one half the length of said blank, means positioned above said channel, adapted to be lowered into said channel for forcing part of said first predetermined portion of material into said channel for drawing a second predetermined portion of material into said channel, and means for separating said first and second predetermined portions of said material from said supply for forming said blank of predetermined size, the length of said blank defined by the edge clamped by the draw clamp and the edge separated from said supply, means on each of said opposite shoulders for clamping the blank adjacent the respective edges defining the length and for transferring said blank in a direction transverse to the direction in which the length of said blank lies, at least two sewing lines each being substantially identical to the other positioned for receiving said blanks in sequence, and each including a second channel being substantially as wide as the first mentioned said channel and including opposite shoulders and adjacent spaced walls, endless belt means individual to each shoulder of said second channel for clamping said blank adjacent the respective edges for conveying said blank along the sewing line, hem folding means individual to each shoulder of said second channel for folding the respective edges of said blank as said blank is conveyed past said folding means, and sewing means individual to each shoulder of said second channel for sewing the hem folded portion of said blank for forming a finished sheet.

8. Apparatus for successively making finished sheets from a supply of limp material as in claim 7 and in which said endless belt means includes a first pair of endless belt means on one shoulder of said opposite shoulders of said second channel each belt of said first pair driven in opposite directions and a second pair of endless belt means on the other of said opposite shoulders of said second channel each belt of said second pair driven in opposite directions, each pair of endless belts cooperating for receiving said blank, and for transferring said blank at a first speed.

9. Apparatus for successively making finished sheets from a supply of limp material as in claim 8 and in which said endless belt means further includes a third pair of endless belt means on said one shoulder overlapping said first pair of endless belt means and extending beyond said first pair and driven in the same direction as said first pair are driven and a fourth pair of endless belt means on said other shoulder overlapping said second pair of endless belt means and extending beyond said second pair and driven in the same direction as said second pair are driven for cooperating with said first and second pair of endless belt means for receiving said blank from said first and second endless belt and for transferring said blank at a second speed.

10. Apparatus for successively making finished sheets from a supply of limp material as in claim 7 and further including a shuttle having a channel having opposite shoulders and adjacent spaced walls, said shuttle channel being substantially the same size as the channel of said blank forming means and means for receiving a blank from said blank forming means and means for transferring said blank to a selected sewing line of said at least two sewing lines.

11. Apparatus for successively making finished sheets from a supply of limp material as in claim 7 and in which said clamping means on each of said opposite shoulder of said blank forming means includes,
    means for rotating each respective means for clamping for transferring said blank in one direction and
    means for reversing rotation of each respective means for clamping, for transferring said blank in the opposite direction.

12. Apparatus for successively making finished sheets from a supply of limp material as in claim 11 and further including,
    first shuttle means having a channel corresponding substantially to the channel of said blank forming means said first shuttle means positioned adjacent said blank forming means in said one direction for receiving blanks from said blank forming means transferred in said opposite direction.

13. Apparatus for making bedsheets and similar articles of large area from a bulk supply of a relatively wide web of limp material, said apparatus comprising;
    means for storing the bulk supply of said material,
    sizing and cutting apparatus for forming blanks of predetermined size from the web of material including;
    means for pulling successive predetermined lengths of the material from said storing means for sizing the blanks to be cut and for placing the body portion of each blank lower than the two ends of the blank,
    means for cutting said web of material for forming said blank,
    means for supporting the two ends of the cut blank higher than its body portion, and
    means for transferring the cut blank out of said sizing and cutting apparatus while its two ends are thus supported higher than its body portion,
    at least first and second hemming line means for alternately receiving the cut blanks, each of said hemming line means extending in a direction substantially transverse to the direction in which material is pulled in predetermined lengths, each said hemming line means including;
    means for moving the cut blanks along the hemming line,
    means extending along the hemming line for supporting the two ends of the cut blanks higher than their body portions,
    folding means for progressively folding the two ends of the blanks during transfer of said blanks as said blank is passed through said folding means for forming hems thereon, and
    sewing means for sewing the hems for finishing the bedsheets or similar articles.

14. Apparatus for making bedsheets and similar articles of large area from a bulk supply of a relatively wide web of limp material, said apparatus comprising,
    means for storing the bulk supply of said material,
    sizing and cutting apparatus for forming blanks of predetermined size from the web of material including,
    means for pulling successive predetermined lengths of the material from said storing means for sizing the blanks to be cut and for placing the body portion of each blank lower than the two ends of the blank said pulling means including
    an elongated draw clamp having
    jaws with a width extending across the width of the web of material, means for moving said draw clamp to a material-grasping position adjacent to the end of the web of material and for retracting the draw clamp from said position,
    means for actuating said jaws to securely grasp the end of the material to pull the material and
    means separate from said draw clamp for lowering the body portion of the blank down lower than the two ends of the blank,
    means for cutting the blank off from the web of material,
    means for supporting the two ends of the cut blank higher than its body portion and
    means for transferring the cut blank out of said sizing and cutting apparatus while its two ends are thus supported higher than its body portion said transferring means including
    a first and a second pair of upper and lower transfer belts,
    said upper belts of each pair being above said lower belts for engaging the respective ends of the blank and
    said first and second pair of transfer belts being separable for permitting said draw clamp to pass between them as said draw clamp moves from its retracted position to said material-grasping position and returns to its retracted position,
    at least one hemming line for receiving the cut blanks, said hemming line including
    means for moving the cut blanks along the hemming line,
    means extending along the hemming line for supporting the two ends of the cut blanks higher than their body portions,
    folding means for folding the two ends of the blanks for forming hems thereon, and
    sewing means for sewing the hems for finishing the bedsheets or similar articles.

15. Apparatus for making bedsheets and similar articles of large area from a bulk supply of a relatively wide web of limp material as claimed in claim 14 in which
    said first and second pairs of transfer belts are associated with said means for supporting the two ends of the cut blank higher than its body portion,
    said pairs of transfer belts closing in gripping relationship with the ends of the blank after said draw clamp has retracted.

16. Apparatus for making bedsheets and similar articles of large area from a bulk supply of a relatively wide limp web of material, said apparatus comprising;
    means for storing said bulk supply of material,
    sizing and cutting apparatus for forming successive blanks of predetermined size from said material including,
    a pair of spaced shoulder means for supporting opposite end portions of the successive blanks,
    said spaced shoulder means defining a channel therebetween,
    means for pulling predetermined length blanks of the web of material from said stored supply across said channel and for lowering the central portion of each blank down into said channel with the opposite ends of the blank being supported on said shoulder means,
    means for cutting the blank from the web of material, and
    means for transferring the cut blanks out of said sizing and cutting apparatus, and
    a plurality of work lines each extending in a direction parallel with said channel of said sizing and cutting apparatus, each said work line including;
    means for moving the cut blanks along said work line,
    a second pair of spaced shoulder means extending along said work line for supporting the opposite ends of the cut blanks as they move along the work line,
    said spaced shoulder means of said work line defining a channel therebetween along which the central portions of the blanks are moved, and
    work performing means associated with said shoulder means of said work line for performing work on the opposite ends of the cut blanks for finishing these ends to complete making the article.

17. Apparatus for making bedsheets and similar articles of large area from a bulk supply of a relatively wide limp web of material as claimed in claim 16 in which said means for transferring the cut blanks out of said sizing and cutting apparatus comprises, a first and a second pair of upper and lower transfer belts, a first and a second pair of upper and lower transfer belts, the first pair of transfer belts extending along one shoulder of the first mentioned said pair of spaced shoulder means for engaging one end of the cut blank, the second pair of transfer belts extend along the other shoulder of the first mentioned said pair of spaced shoulder means for engaging the other end of the cut blank, and both pairs of said transfer belts extending parallel with said channel of said sizing and cutting apparatus are alternately reversible in direction for transferring said blanks from said channel of said sizing and cutting apparatus in one direction into one work line of said plurality of work lines and for transferring said blanks from said channel of said sizing and cutting apparatus in the other direction into another work line of said pluality of work lines.

18. Apparatus for making bedsheets and similar articles of large area from a bulk supply of a relatively wide limp web of material, said apparatus comprising;

means for storing said bulk supply of material, sizing and cutting apparatus for forming successive blanks of predetermined size from said material including, a pair of spaced shoulder means for supporting opposite end portions of the successive blanks, said spaced shoulder means defining a channel therebetween, means for pulling predetermined length blanks of the web of material from said stored supply across said channel and for lowering the central portion of each blank down into said channel with the opposite ends of the blank being supported on said shoulder means, means for cutting the blank from the web of material, and means for transferring the cut blanks out of said sizing and cutting apparatus, a plurality of work lines each extending in a direction parallel with said channel of said sizing and cutting apparatus, shuttle means for receiving the cut blanks from said transfer means of said sizing and cutting apparatus and for feeding the cut blanks into the respective work lines, each said work line including;

means for moving the cut blanks along said work line, a pair of spaced shoulder means extending along said work line for supporting the opposite ends of the cut blanks as they move along the work line, said spaced shoulder means of said work line defining a channel therebetween along which the central portions of the blanks are moved, and work performing means associated with said shoulder means of said work line for performing work on the opposite ends of the cut blanks for finishing these ends to complete making the articles.

19. Apparatus for making bedsheets and similar articles of large area as in claim 13 and in which said first hemming line extends in a first direction substantially transverse to the direction in which the material is pulled and said first direction is to the left and said second hemming line means extends in a second direction substantially transverse to the direction in which the material is pulled and said second direction is to the right.

20. Apparatus for making bedsheets and similar articles of large area as in claim 13 and in which said first hemming line means includes at least a first and a second work line each for hemming the opposite edges of a cut blank and said second hemming line means includes at least a first and a second work line each for hemming the opposite edges of a cut blank.

21. Apparatus for making bedsheets and similar articles of large area as in claim 20 and further including first shuttle means disposed between said sizing and cutting apparatus and said first hemming line means for receiving cut blanks from said transferring means and for distribution of such cut blanks to said first and second work lines of said second hemming line means.

References Cited

UNITED STATES PATENTS

| | | |
|---|---|---|
| 2,546,831 | 3/1951 | Newell. |
| 2,738,746 | 3/1956 | MacIsaac et al. |
| 2,757,624 | 8/1956 | MacIsaac. |
| 3,224,394 | 12/1965 | Dobner et al. |
| 3,375,796 | 4/1968 | Greenberg et al. __ 112—10 XR |

JAMES R. BOLER, Primary Examiner

U.S. Cl. X.R.

112—10, 203, 255